United States Patent [19]
Yamamoto

[11] Patent Number: 5,854,743
[45] Date of Patent: Dec. 29, 1998

[54] CONTROL SYSTEM FOR POWER CONVERSION SYSTEM

[75] Inventor: Hajime Yamamoto, Kanagawa-ken, Japan

[73] Assignee: Kabushiki Kaisha Toshiba, Kawasaki, Japan

[21] Appl. No.: 18,184

[22] Filed: Feb. 3, 1998

[30] Foreign Application Priority Data

Feb. 27, 1997 [JP] Japan ................................. 9-043515

[51] Int. Cl.$^6$ ...................................................... H02H 3/24
[52] U.S. Cl. .............................................. 363/71; 363/96
[58] Field of Search .................................. 363/65, 71, 96, 363/135, 136; 307/17, 31, 32, 33

[56] References Cited

U.S. PATENT DOCUMENTS

| | | | |
|---|---|---|---|
| 5,257,180 | 10/1993 | Sashida et al. | 363/71 |
| 5,355,297 | 10/1994 | Kawabata et al. | 363/43 |
| 5,552,977 | 9/1996 | Xu et al. | 363/41 |
| 5,737,206 | 4/1998 | Yamamoto | 363/97 |

FOREIGN PATENT DOCUMENTS 7-135776  5/1995  Japan .
8-33351  2/1996  Japan .

*Primary Examiner*—Matthew Nguyen
*Attorney, Agent, or Firm*—Oblon, Spivak, McClelland, Maier, & Neustadt, P.C.

[57] ABSTRACT

A control system for a power conversion system composed of a plurality of unit converters and a transformer for connecting AC outputs of the unit converters in series. The control system includes a unit for detecting an AC system voltage at the primary winding of the transformer, a unit for generating a command voltage vector of a voltage output from the power conversion system at the primary winding of the transformer based on the AC system voltage, and an actual voltage vector selecting unit for preparing a plurality of actual voltage vectors of voltages output from the power conversion system at the primary winding of the transformer, and selecting one of them as a selected actual voltage vector. The control system further includes a unit converter voltage vector determining unit for determining a plurality of unit converter voltage vectors based on the selected actual voltage vector, a unit for generating a plurality of ON-OFF pattern signals for the self-turn-off devices, each determined by one of the unit converter voltage vectors, respectively, and a unit for generating gate pulses to the self-turn-off devices of the unit converters based on the ON-OFF pattern signals.

7 Claims, 16 Drawing Sheets

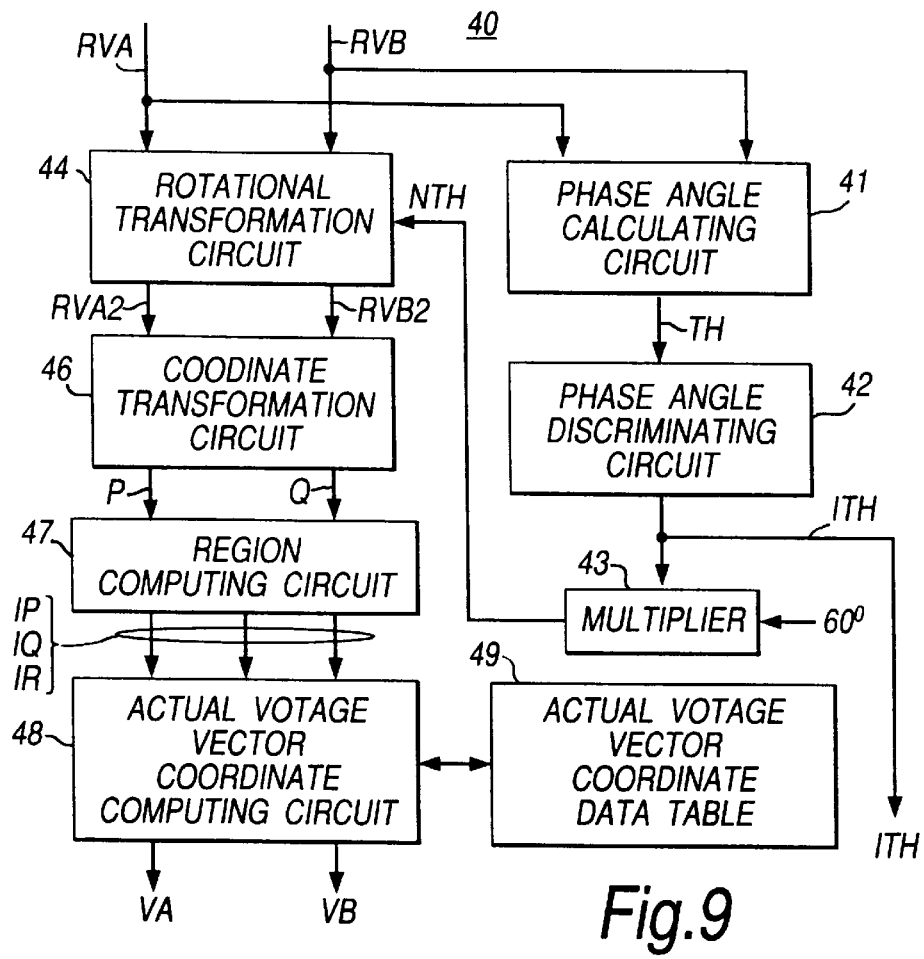
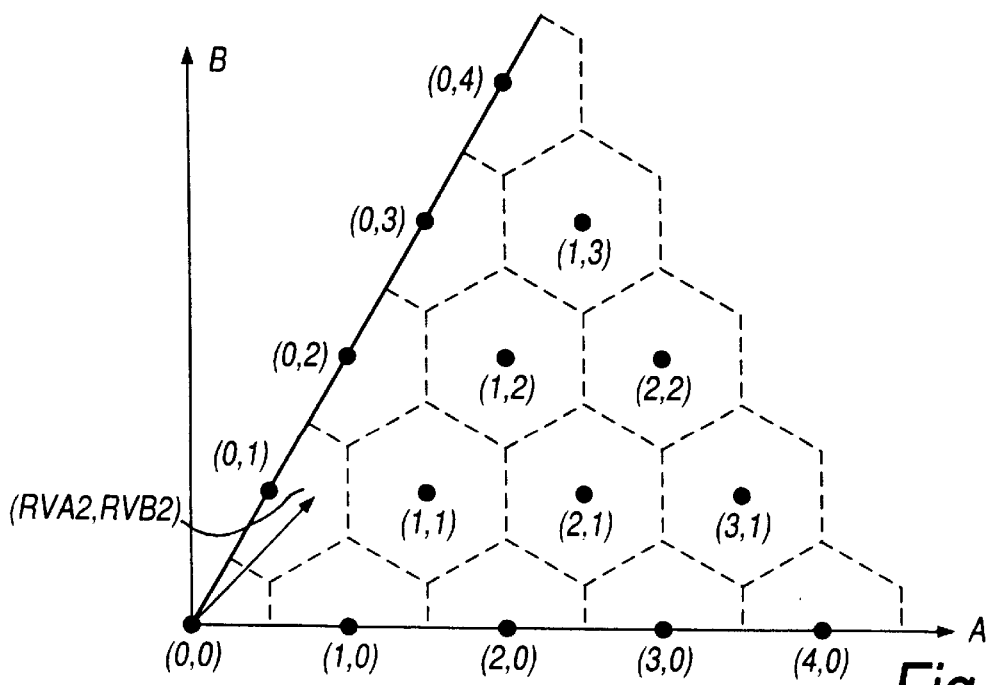
Fig.9
Fig.10

ACTUAL VOLTAGE VECTOR
COORDINATE DATA TABLE 49

| (IP, IQ, IR) | (VA, VB) |
|---|---|
| (0, 0, 0) | (0, 0) |
| (0, 0, 1) | (0, 0) |
| (0, 1, 0) | (0, 1) |
| (1, 0, 1) | (1, 0) |
| (1, 1, 0) | (1, 0) |
| (1, 1, 1) | (0, 1) |
| (1, 2, 0) | (0, 1) |
| (1, 2, 1) | (0, 1) |
| ⋮ | ⋮ |
| (8, 4, 0) | (4, 0) |
| (8, 4, 1) | (4, 0) |

Fig.11A

CONTROL SYSTEM FOR POWER CONVERSION SYSTEM

BACKGROUND OF THE INVENTION

1. Field of the Invention

This invention relates to a control system for a power conversion system, and more particularly to a control system for a power conversion system which takes out an output by connecting AC outputs of a plurality of unit converters in series by a transformer.

2. Description of the Related Art

FIG. 20 is a block diagram showing the construction of a main circuit of a conventional power conversion system to which the present invention is applicable. In this diagram, a primary winding 1P of a transformer 1 is connected to the system, 2A–2D represent secondary windings of transformer 1 connected to primary winding 1P of transformer 1, 3A–3D are converters each of which is composed of gate turn-off-thyristors (hereinafter, referred to simply as GTO) and diodes, 4 is a DC power source, and 5–10 represent GTOs of converter 3A. In primary winding 1P of transformer 1, the primary winding of each phase is connected in series for secondary windings 2A–2D of each phase.

FIG. 21 is a block diagram showing a conventional control system which controls the power conversion system shown in FIG. 20.

In FIG. 21, the same reference numerals shown in FIG. 20 have the same functions, and therefore the explanation thereof will be omitted here.

In FIG. 21, 11 is an AC system and, 12 is a voltage detector to detect line-to-line voltages of AC system 11. 13 is a line-to-line voltage→phase voltage conversion circuit, 14 is a three-phase→two-phase conversion circuit to which the output of line-to-line voltage→phase voltage conversion circuit 13 is applied, 15 is a phase angle computing circuit and converts a two-phase AC signal that is the output of three-phase→two-phase conversion circuit 14 to a phase angle. 16 is a triangular wave generating circuit and generates triangular waves corresponding to phase 0° to 360°. 17 is a current control circuit to control the output currents of converters 3A–3D. 18 is an adder to add up the output of three-phase→two-phase conversion circuit 14 and the output of current control circuit 17. 19 is a two-phase→three-phase conversion circuit to which the output of adder 18 is applied. 20 is a cross point detecting circuit to which the output of two-phase→three-phase conversion circuit 19 and the output of triangular wave generating circuit 16 are applied and generates a signal to turn GTOs of converters 3A–3D ON/OFF by detecting cross points of triangular waves and three-phase voltage commands. 21 is a gate pulse generating circuit to generate gate pulses to turn the GTOs of converters 3A–3D ON/OFF based on the signal outputted from cross point detecting circuit 20.

FIG. 22 shows waveforms for explaining the actions when the power conversion system shown in FIG. 20 is controlled by the conventional control system shown in FIG. 21.

In FIG. 22, in each of waveforms, the horizontal axis shows the time measured by second. The vertical axis in each of waveforms, except that of phase angle signal THL, shows the voltage measured by power unit (PU). The vertical axis in the waveform THL shows the angle measured by degree (°).

Hereinafter, the actions will be explained with reference to FIG. 20, FIG. 21 and FIG. 22.

VLUV, VLVW and VLWU shown in FIG. 22 are UV-phase, VW-phase and WU-phase line-to-line voltages of the system detected at primary winding 1P of transformer 1 by voltage detector 12, respectively. Line-to-line voltage→phase voltage conversion circuit 13 converts line-to-line voltages VLUV, VLVW and VLWU into U-, V-, and W-phase voltages VLU, VLV and VLW respectively by performing the operations of the following equations.

$VLU=(2\times VLUV+VLVW)/3$ $VLV=(2\times VLVW+VLWU)/3$ $VLW=(2\times VLWU+VLUV)/3$ Three-phase→two-phase conversion circuit 14 converts phase voltages VLU, VLV and VLW to two-phase signals VLA and VLB in an orthogonal AB coordinate system by performing the operations of the following equations. In this case, it is assumed that an axis A is taken in the U-phase direction and an axis B is advanced from axis A by 90°.

$VLA=VLU-(VLV+VLW)/2$ $VLB=(VLV-VLW)\times\sqrt{3/2}$

Outputs VLA, VLB of three-phase→two-phase conversion circuit 14 and the outputs of current control circuit 17 are added up by adder 18. In order to make the explanation easy to understand, hereinafter it is assumed that the outputs of current control circuit 17 are zero. That is, the state where converters 3A–3D generate voltages equivalent to voltages of AC system 11 and the output currents are zero will be explained. Therefore, outputs VA0, VB0 of adder 18 are equivalent to VLA, VLB.

Phase angle computing circuit 15 computes a phase angle signal THL from outputs VLA, VLB of three-phase→two-phase conversion circuit 14 by performing the operation of the following equations.

When VLB is positive and VLA is larger than (an absolute value of VLB):

$THL=\tan^{-1}(VLB/VLA)$

When VLB is larger than (an absolute value of VLA):

$THL=-\tan^{-1}(VLA/VLB)+90°$

When VLA is smaller than–(an absolute value of VLB):

$THL=\tan^{-1}(VLB/VLA)+180°$

When VLB is smaller than–(an absolute value of VLA):

$THL=-\tan^{-1}(VLA/VLB)+270°$

When VLB is negative and VLA is larger than (an absolute value of VLB):

$THL=\tan^{-1}(VLB/VLA)+360°$

The waveform of phase angle signal THL is shown in FIG. 22 which is measured by radian.

Triangular wave generating circuit 16 converts phase angle signal THL into a triangular wave signal TRIUA which is a triangular wave signal to control U-phase GTOs of converter 3A by performing the operation of the following equation.

$THO=THL\times 9$

When THO is larger than 360°×n (n is 0 or an integer larger than 0) and is smaller than 360°×n+180°:

$$TRIUA = 1 - (THO - n \times 360°)/90°$$

When THO is larger than 360°×n (n is 0 or an integer larger than 0)+180° and is smaller than 360°×n+360°:

$$TRIUA = -3 + (THO - n \times 360°)/90°$$

The waveform of triangular wave signal TRIUA is shown in FIG. 22. TRIUA is triangular wave signal which controls U-phase GTOs 5, 8 of converter 3A.

At the same time, triangular wave generating circuit 16 generates triangular wave signals TRIUB, TRIUC and TRIUD by performing the similar operation according to the following equations:

$$THO = THL \times 9 - 90° \text{ (for converter 3B)}$$

$$THO = THL \times 9 - 180° \text{ (for converter 3C)}$$

$$THO = THL \times 9 - 270° \text{ (for converter 3D)}$$

TRIUB, TRIUC and TRIUD are triangular wave signals, although not shown, to control U-phase GTOs of converters 3B, 3C and 3D, respectively.

At the same time, triangular wave generating circuit 16 generates triangular wave signals TRIVA, TRIVB, TRIVC and TRIVD by performing the similar operation according to the following equations:

$$THO = (THL - 120°) \times 9 \text{ (for converter 3A)}$$

$$THO = (THL - 120°) \times 9 - 90° \text{ (for converter 3B)}$$

$$THO = (THL - 120°) \times 9 - 180° \text{ (for converter 3C)}$$

$$THO = (THL - 120°) \times 9 - 270° \text{ (for converter 3D)}$$

TRIVA, TRIVB, TRIVC and TRIVD are triangular wave signals, although not shown, to control V-phase GTOs of converters 3A, 3B, 3C and 3D, respectively.

At the same time, triangular wave signal generating circuit 16 generates triangular wave signals TRIWA, TRIWB, TRIWC and TRIWD by performing the similar operation according to the following equations:

$$THO = (THL - 240°) \times 9 \text{ (for converter 3A)}$$

$$THO = (THL - 240°) \times 9 - 90° \text{ (for converter 3B)}$$

$$THO = (THL - 240°) \times 9 - 180° \text{ (for converter 3C)}$$

$$THO = (THL - 240°) \times 9 - 270° \text{ (for converter 3D)}$$

TRIWA, TRIWB, TRIWC and TRIWD are triangular wave signals, although not shown, to control W-phase GTOs of converters 3A, 3B, 3C and 3D, respectively.

Two-phase→three-phase conversion circuit 19 converts two-phase signals VA0 and VB0 generated from adder 18 into three-phase signals VUR, VVR and VWR as shown in the following formulas.

$$VUR = 2/3 \times VA0$$

$$VVR = -1/3 \times VA0 + 1/\sqrt{3} \times VB0$$

$$VWR = -1/3 \times VA0 - 1/\sqrt{3} \times VB0$$

Here, signals VUR, VVR and VWR are respectively used as U-phase, V-phase and W-phase voltage commands for converters 3A–3D commonly.

In FIG. 22, VUR is U-phase voltage command and VUVA is a UV-phase line-to-line output voltage of converter 3A.

U-phase voltage command VUR and triangular wave signal TRIUA are compared in cross point detecting circuit 20, and when VUR is larger than TRIUA, GTO 5 is turned ON and VUR is smaller than TRIUA, GTO 8 is turned ON. Similarly, ON/OFF of GTO 6 and GTO 9 are decided by comparing V-phase voltage command VVR with triangular wave signal TRIVA, and ON/OFF of GTO 7 and GTO 10 are decided by comparing W-phase voltage command VWR with triangular wave signal TRIWA, although not shown.

As a result, a UV line-to-line voltage VUVA of converter 3A is obtained as shown in FIG. 22. As for converters 3B, 3C and 3D, the same ON/OFF controls as described above with respect to converter 3A are performed. As a result, UV line-to-line voltages VUVB, VUVC and VUVD of converters 3B, 3C and 3D are respectively obtained as shown in FIG. 22.

UV line-to-line voltages VUVA, VUVB, VUVC and VUVD are applied to UV-phases of secondary windings 2A, 2B, 2C and 2D of transformer 1, respectively, and a sine wave voltage VU (not shown) is generated in U-phase of transformer primary winding 1P. Similarly, in V-phase of transformer primary winding 1P, a sine wave voltage VV (not shown) of which phase is delayed 120° against U-phase voltage VU is generated, and a voltage VUV is generated between U-phase and V-phase lines. Voltage VUV becomes a voltage having fundamental wave equal to system UV-phase line-to-line voltage VLUV, and GTOs composing converters 3A–3D repeat many times of switchings corresponding to PWM waveforms of voltages VUVA–VUVD.

Above description has been made with respect to UV-phase of the power conversion system. As for VW-phase and WU-phase, the power conversion system operates the same as in the UV-phase, so that the description thereof is omitted so as to make the description to be concise.

As described above, with the generation of sine wave voltages by converters 3A, 3B, 3C and 3D, the self-turn-off devices of converters 3A, 3B, 3C and 3D repeat 9 times of ON/OFF switchings per cycle. As a result, the loss resulting from the switching is large and the converter efficiency drops.

SUMMARY OF THE INVENTION

Accordingly, one object of this invention is to provide a control system for a power conversion system operated by connecting AC outputs of a plurality of unit converters in series by a transformer which can suppress the number of switchings of self-turn-off devices in the unit converters, can reduce the loss resulting from the switchings and can increase the converter efficiency by controlling the unit converters so that the voltages generated on the primary winding of the transformer become a sine wave.

Another object of this invention is to provide a control system for a power conversion system operated by connecting AC outputs of a plurality of unit converters in series by a transformer which can control the unit converters such that no DC components are generated in the voltages applied to the transformer and the transformer is not saturated by the DC components, and thereby can continue the operation of the power conversion system even in the case of a system failure.

These and other objects of this invention can be achieved by providing a control system for a power conversion system composed of a plurality of unit converters and a transformer for connecting AC outputs of the unit converters in series, each of the unit converters composed of a plurality of bridge connected self-turn-off devices for converting DC power into AC power, each of AC sides of the unit converters connected to one of secondary windings of the transformer, respectively, DC sides of the unit converters connected in parallel to each other, respectively, and a primary winding of the transformer connected in series for each phase to take out an output of the power conversion system and adapted for connecting to an AC power system. The control system includes a unit for detecting an AC system voltage at the series connected primary winding of the transformer, a unit for generating a command voltage vector of a voltage to be output from the power conversion system at the primary winding of the transformer based on the AC system voltage, and an actual voltage vector selecting unit for preparing a plurality of actual voltage vectors of voltages which can be actually output from the power conversion system at the primary winding of the transformer, preparing a plane in which start points of the actual voltage vectors are commonly taken as an origin and the actual voltage vectors are expressed at respective end points of the actual voltage vectors, dividing the plane into a plurality of regions, each including one of the end points of the actual voltage vectors, respectively, and when an end point of the command voltage vector is included in one of the regions, selecting the actual voltage vector included in the one of the regions as a selected actual voltage vector. The control system further includes a unit converter voltage vector determining unit for determining a plurality of unit converter voltage vectors based on the selected actual voltage vector, each of the unit converter voltage vectors allocated to one of the unit converters, respectively, and output from one of the unit converters, respectively, a unit for generating a plurality of ON-OFF pattern signals for the self-turn-off devices, each determined by one of the unit converter voltage vectors, respectively, and a unit for generating gate pulses to the self-turn-off devices of the unit converters based on the ON-OFF pattern signals.

According to one aspect of this invention, there is provided a control system for a power conversion system composed of a plurality of unit converters and a transformer for connecting AC outputs of the unit converters in series, each of the unit converters composed of a plurality of bridge connected self-turn-off devices for converting DC power into AC power, each of AC sides of the unit converters connected to one of secondary windings of the transformer, respectively, DC sides of the unit converters connected in parallel to each other, respectively, and a primary winding of the transformer connected in series for each phase to take out an output of the power conversion system and adapted for connecting to an AC power system. The control system includes a unit for detecting an AC system voltage at the series connected primary winding of the transformer, a unit for generating a command voltage vector of a voltage to be output from the power conversion system at the primary winding of the transformer based on the AC system voltage, and an actual voltage vector selecting unit for preparing a plurality of actual voltage vectors of voltages which can be actually output from the power conversion system at the primary winding of the transformer, preparing a plane in which start points of the actual voltage vectors are commonly taken as an origin and the actual voltage vectors are expressed at respective end points of the actual voltage vectors, dividing the plane into a plurality of regions, each including one of the end points of the actual voltage vectors, respectively, and when an end point of the command voltage vector is included in one of the regions, selecting the actual voltage vector included in the one of the regions as a selected actual voltage vector. The control system further includes a unit converter voltage vector determining unit for determining a plurality of unit converter voltage vectors based on the selected actual voltage vector, each of the unit converter voltage vectors allocated to one of the unit converters, respectively, and output from one of the unit converters, respectively, a unit for generating a plurality of ON-OFF pattern signals for the self-turn-off devices, each determined by one of the unit converter voltage vectors, respectively, and a unit for generating gate pulses to the self-turn-off devices of the unit converters based on the ON-OFF pattern signals. The control system further includes a magnetic flux detecting unit for detecting quantities equivalent to magnetic fluxes interlinking to the secondary windings of the transformer, wherein the unit converter voltage vector determining unit determines a plurality of the unit converter voltage vectors based on the selected actual voltage vector and the quantities equivalent to the magnetic fluxes, each of the unit converter voltage vectors allocated to one of the unit converters, respectively, and output from one of the unit converters, respectively.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 is a block diagram showing a detailed construction of an actual voltage vector selecting circuit 40 according to a second embodiment of this invention;

FIG. 10 is a diagram showing divided regions of actual voltage vectors used in the second embodiment;

FIGURE 11A is a diagram showing the construction of actual voltage vector coordinate data table 49 shown in FIG. 9;

DETAILED DESCRIPTION OF THE PREFERRED EMBODIMENTS

Figure 1:
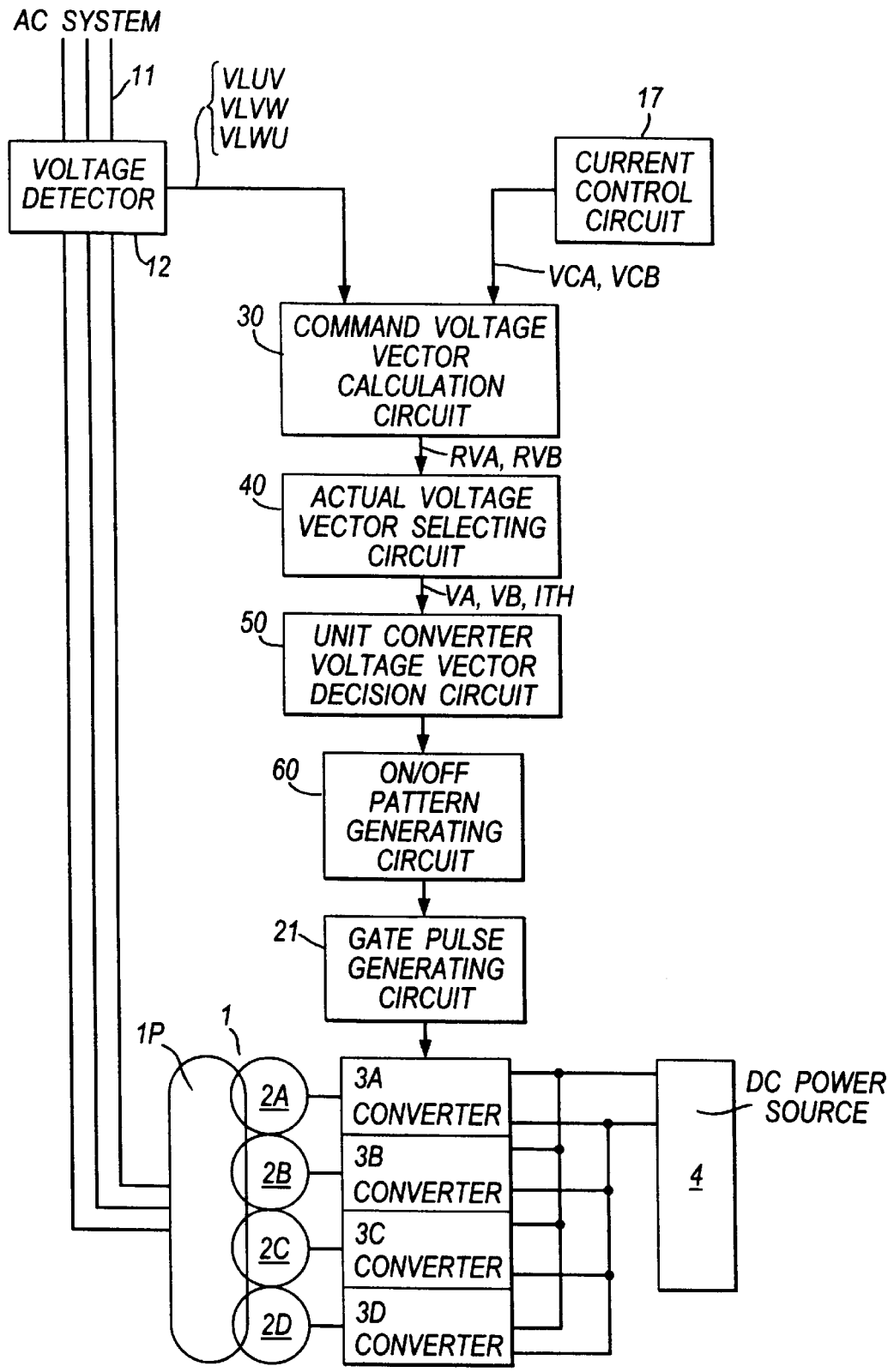
FIG. 1 is a block diagram showing a control system for a power conversion system according to a first embodiment of this invention.

Referring now to the drawings, wherein like reference numerals designate identical or corresponding parts throughout the several views, the embodiments of this invention will be described below.

FIG. 1 is a block diagram showing a control system for a power conversion system according to a first embodiment of the present invention.

In FIG. 1, 1, 1P, 2A–2D, 3A–3D, 4, 11, 12, 17 and 21 have been already explained and therefore, the explanation thereof will be omitted here.

In FIG. 1, system line-to-line voltages VLUV, VLVW, VLWU detected by voltage detectors 12 and the outputs of current control circuit 17 to control output currents of converters 3A–3D to specified values are sent to a command voltage vector calculation circuit 30, and a command voltage vector corresponding to voltages to be output by unit converters 3A–3D are computed. An actual voltage vector selecting circuit 40 selects an actual voltage vector corresponding to voltages that are actually output by unit converters 3A–3D from the command voltage vector computed by command voltage vector calculation circuit 30. A unit converter voltage vector decision circuit 50 decomposes the actual voltage vector to voltage vectors that are to be output by each of unit converters 3A–3D and decides the switching state of each of unit converters 3A–3D. An ON/OFF pattern generating circuit 60 generates a signal to turn ON/OFF the self-turn-off devices of each unit converter according to the switching state of each unit converter that is output by unit converter voltage vector decision circuit 50. Gate pulse generating circuit 21 generates gate pulses to turn GTOs of unit converters 3A–3D ON/OFF based on the output of ON/OFF pattern generating circuit 60.

Figure 2:
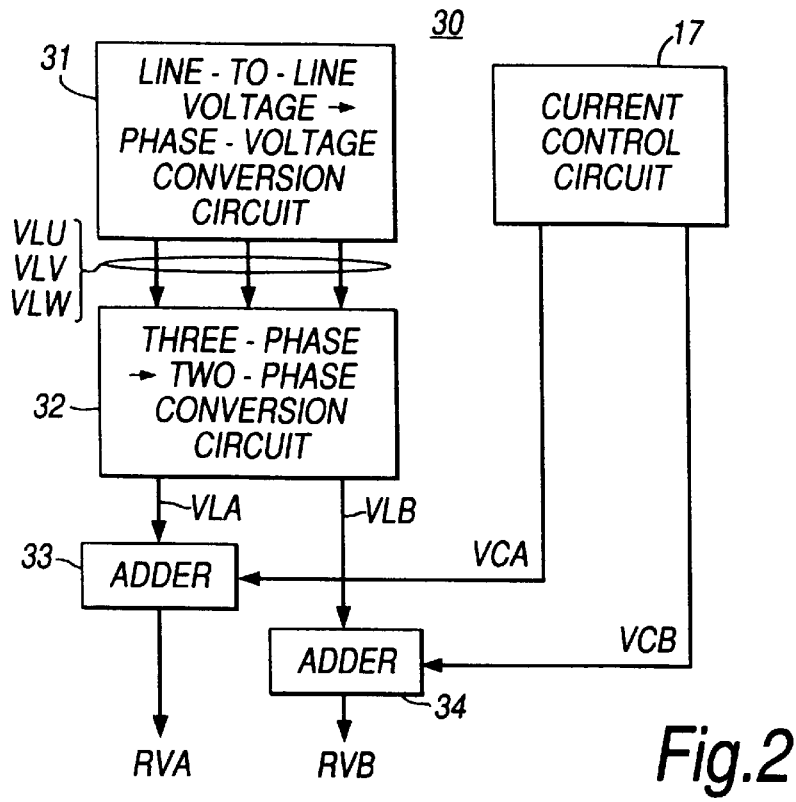
FIG. 2 is a block diagram showing a detailed construction of a command voltage vector calculating circuit 30 in the first embodiment shown in FIG. 1.

Further, using FIG. 1 through FIG. 8, the operation of the first embodiment will be described. FIG. 2 is a block diagram showing the construction of command voltage vector calculation circuit 30 shown in FIG. 1.

The AC system line-to-line voltages VLUV, VLVW and VLWU detected by voltage detector 12 are converted to phase voltage VLU, VLV and VLW by a line-to-line voltage→phase voltage conversion circuit 31 by performing the following equations.

$$VLU=(2 \times VLUV+VLVW)/3$$

$$VLV=(2 \times VLVW+VLWU)/3$$

$$VLW=(2 \times VLWU+VLUV)/3$$

Further, phase voltages VLU, VLV and VLW obtained by line-to-line voltage→phase voltage conversion circuit 31 are converted to two-phase signals VLA and VLB in a three-phase→two-phase conversion circuit 32 according to the following equations. In this case, it is assumed that axis A is taken in the U-phase direction and axis B is advanced from axis A by 90°.

$$VLA=VLU-(VLV+VLW)/2$$

$$VLB=(VLV-VLW) \times \sqrt{3/2}$$

Outputs VLA, VLB of three-phase→two-phase conversion circuit 32 are respectively added with outputs VCA, VCB of current control circuit 17 in an adder 33 and an adder 34 according to the following equations, and A, B axis direction components RVA, RVB of the command voltage vector are computed.

$$RVA=VLA+VCA$$

$$RVB=VLB+VCB$$

Figure 3:
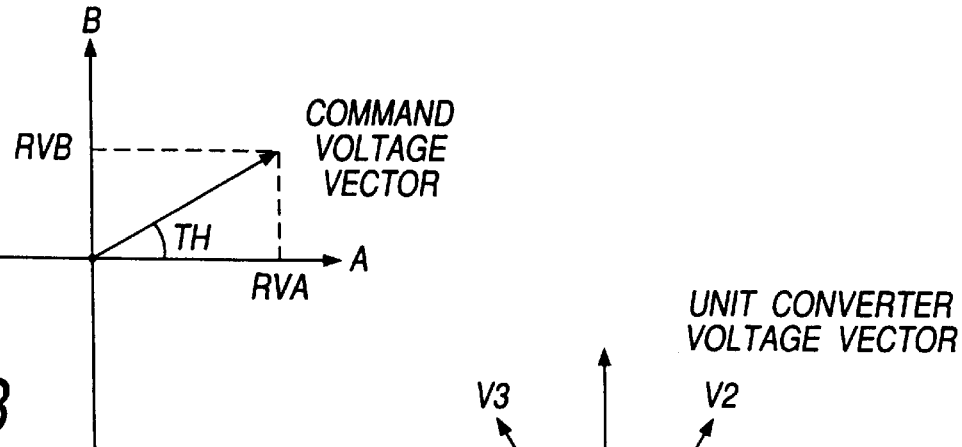
FIG. 3 is a diagram showing a command voltage vector.

As a result, the command voltage vector shown in FIG. 3 are decided.

Figure 4:
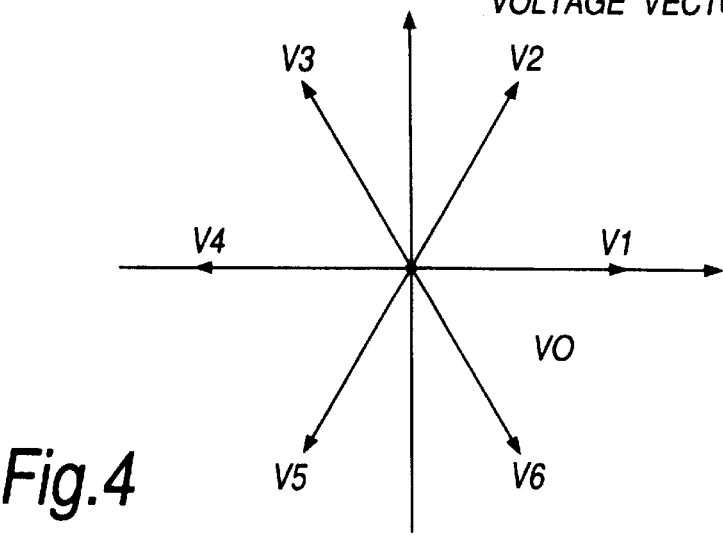
FIG. 4 is a diagram showing voltage vectors that can be generated by a unit converter.

FIG. 4 shows output voltages that can be generated by one unit converter which can be expressed by 7 kinds of vectors V0 to V6. The relation between these vectors V0–V6 and the switching status of corresponding GTOs 5–10 is shown in Table below.

TABLE

|  | GTO 5 | GTO 6 | GTO 7 | GTO 8 | GTO 9 | GTO 10 |
| --- | --- | --- | --- | --- | --- | --- |
| Vector V0 | OFF | OFF | OFF or | ON | ON | ON |
|  | ON | ON | ON | OFF | OFF | OFF |
| Vector V1 | ON | OFF | OFF | OFF | ON | ON |
| Vector V2 | ON | ON | OFF | OFF | OFF | ON |
| Vector V3 | OFF | ON | OFF | ON | OFF | ON |
| Vector V4 | OFF | ON | ON | ON | OFF | OFF |
| Vector V5 | OFF | OFF | ON | ON | ON | OFF |
| Vector V6 | ON | OFF | ON | OFF | ON | OFF |

Figure 5:
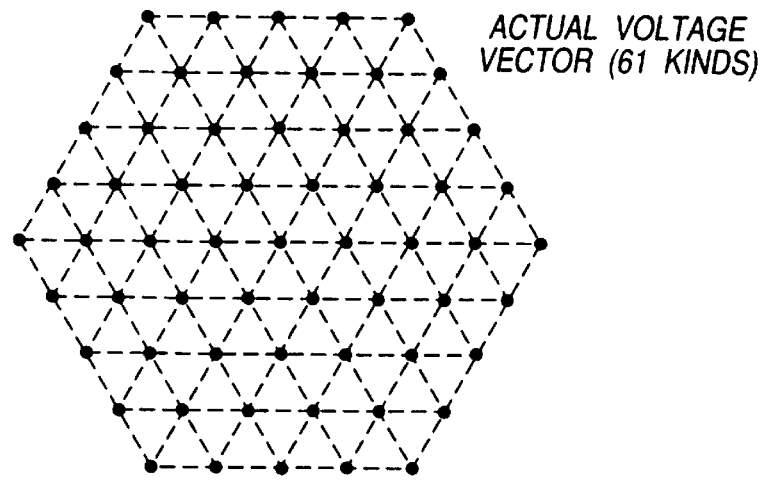
FIG. 5 is a diagram showing actual voltage vectors that can be generated by converters 3A–3D at primary winding 1P of transformer 1.

FIG. 5 is a diagram showing actual voltage vectors corresponding to voltages that can be generated by converters 3A–3D at the primary side of transformer 1. In FIG. 5, vectors connecting the origin and black points represent actual voltage vectors, and 61 vectors are shown in FIG. 5.

FIG. 5 shows actual voltage vectors when 4 units of converters 3A–3D are connected in series. Even when the number of converters that are connected in series are different, actual voltage vectors can be expressed by the similar diagram as FIG. 5.

Figure 6:
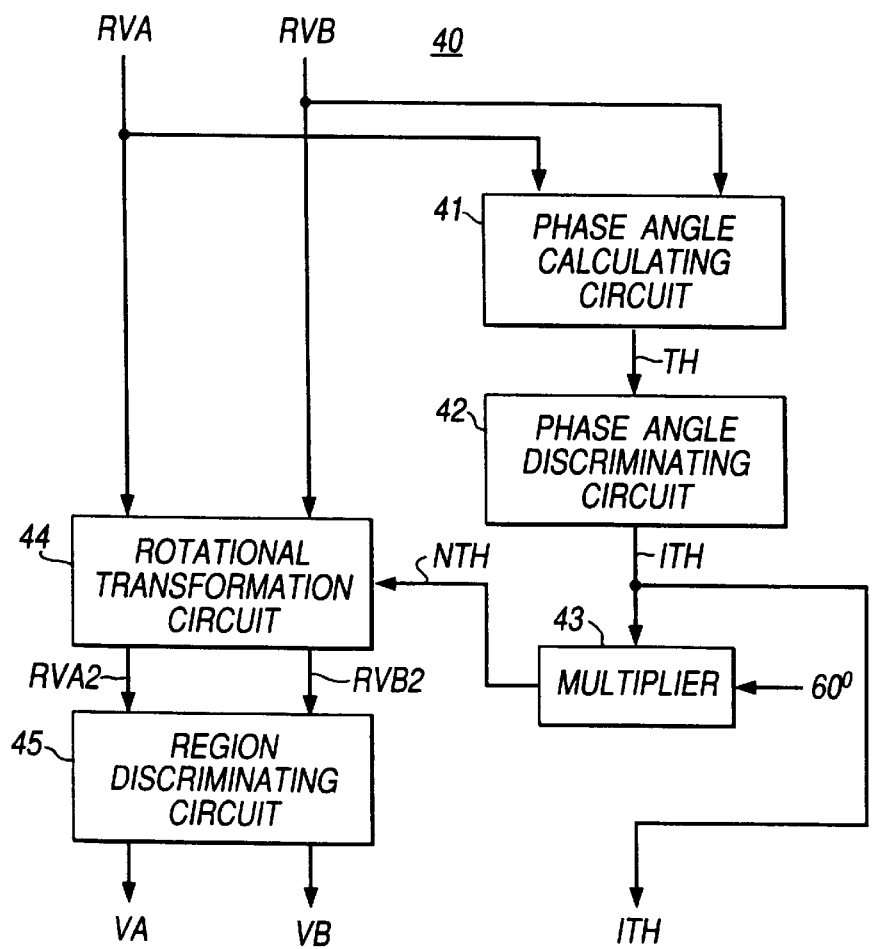
FIG. 6 is a block diagram showing a detailed construction of an actual voltage vector selecting circuit 40 in the first embodiment shown in FIGURE. 1.

FIG. 6 is a block diagram showing the construction of actual voltage vector selecting circuit 40 shown in FIG. 1.

Axis A direction component RVA and axis B direction component RVB of the command voltage vector that are output from command voltage vector calculation circuit 30 are input to a phase angle calculating circuit 41, and a phase angle TH of the command voltage vector is computed according to the following equations.

When RVB is positive and RVA is larger than (an absolute value of RVB):

$$TH = \tan^{-1}(RVB/RVA)$$

When RVB is larger than (an absolute value of RVA):

$$TH = -\tan^{-1}(RVA/RVB) + 90°$$

When RVA is smaller than -(an absolute value of RVB):

$$TH = \tan^{-1}(RVB/RVA) + 180°$$

When RVB is smaller than -(an absolute value of RVA):

$$TH = -\tan^{-1}(RVA/RVB) + 270°$$

When RVB is negative and RVA is larger than (an absolute value of RVB):

$$TH = \tan^{-1}(RVB/RVA) + 360°$$

A phase angle discriminating circuit 42 computes a signal ITH expressing six 60 degree sections to which the command voltage vector belongs by the comparison of the size of phase angle TH of command voltage vector according to the following equations.

When $$0° \leq TH < 60° : ITH = 0$$

When $$60° \leq TH < 120° : ITH = 1$$

When $$120° \leq TH < 180° : ITH = 2$$

When $$180° \leq TH < 240° : ITH = 3$$

When $$240° \leq TH < 300° : ITH = 4$$

When $$300° \leq TH < 360° : ITH = 5$$

Figure 7:
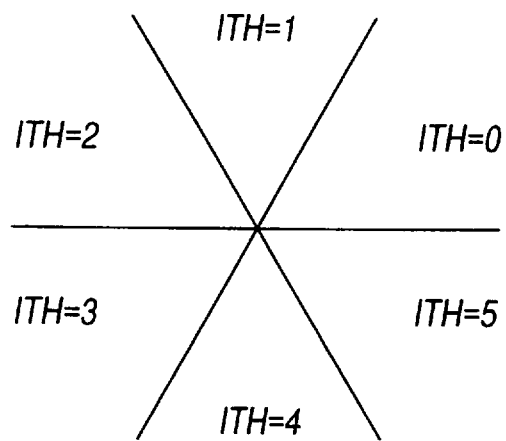
FIG. 7 is a diagram showing the 60° sections corresponding to output ITH of phase angle discriminating circuit 42.

FIG. 7 is a diagram showing the 60° sections corresponding to output ITH of phase angle discriminating circuit 42. Signal ITH becomes an output of actual voltage vector selecting circuit 40. At the same time, signal ITH is input to a multiplier 43, in which a signal NTH is computed according to the following equation.

$$NTH = 60° \times ITH$$

A rotational transformation circuit 44 converts coordinate values (RVA, RVB) of the command voltage vector into coordinate values (RVA2, RVB2) according to the output NTH of multiplier 43.

$$RVA2 = RVA \times \cos(NTH) + RVB \times \sin(NTH)$$

$$RVB2 = -RVA \times \sin(NTH) + RVB \times \cos(NTH)$$

Figure 8:
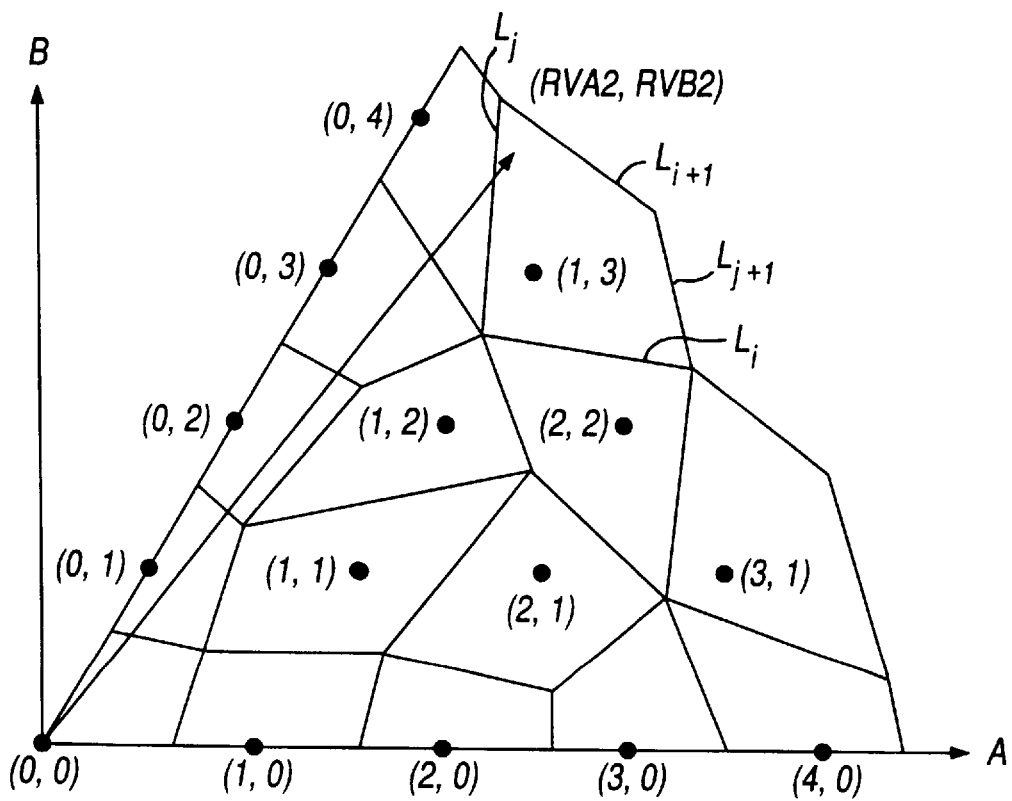
FIG. 8 is a diagram showing divided regions of actual voltage vectors used in the first embodiment.

A region discriminating circuit 45 discriminates a region to which the end point of command voltage vector expressed by outputs RVA2, RVB2 of rotational transformation circuit 44 belongs, out of a plurality of regions, each including one of end points of the actual voltage vectors, respectively. FIG. 8 shows one example of the state where end points of actual voltage vectors are classified. Coordinate values (0, 0), (0, 1) . . . (i, j) . . . are allocated to each end point of the actual voltage vectors in order from the origin as shown in FIG. 8. Straight lines $L_i$, $L_{i+1}$, $L_j$, $L_{j+1}$ to divide regions to which end points of the actual voltage vectors belong are expressed by the following equations.

$$L_i : a_i \times A + b_i \times B = c_i$$

$$L_{i+1} : a_{i+1} \times A + b_{i+1} \times B = c_{i+1}$$

$$L_j : a_j \times A + b_j \times B = c_j$$

$$L_{j+1} : a_{j+1} \times A + b_{j+1} \times B = c_{j+1}$$

The positional relation between the straight lines determining the boundary of the region and coordinate value (RVA2, RVB2) of command voltage vector is computed for each region by the following computation.

For boundary line $L_i$, if $(a_i \times RVA2 + b_i \times RVB2)$ is larger than $c_i$, (RVA2, RVB2) is on the upper side of the boundary line $L_i$. If $(a_i \times RVA2 + b_i \times RVB2)$ is smaller than $c_i$, (RVA2, RVB2) is on the lower side of the boundary line $L_i$.

By repeating the above process for each boundary line, it becomes clear at which side of each region, (RVA2, RVB2) is positioned, and the region to which (RVA2, RVB2) belongs is finally decided. Coordinate value (VA, VB) of the end point of the actual voltage vector included in the decided region is output as a selected actual voltage vector from region discriminating circuit 45.

One example will be described below. It is assumed that a command voltage vector (RVA2, RVB2) is as shown in FIG. 8. The end point of this command voltage vector is positioned in a region determined by boundary lines $L_i$, $L_{i+1}$, $L_j$, $L_{j+1}$ as shown in FIG. 8. Coordinate value (VA, VB), in this case (1, 3), of the end point of the actual voltage vector included in this region is output as a selected actual voltage vector from region discriminating circuit 45.

Although it is described that the boundary lines are straight lines and each region is divided by four boundary lines in the above, the boundary lines may be curved lines and each region may divided by a plurality of lines except four lines.

Unit converter voltage vector decision circuit 50 decides unit converter voltage vectors to be allocated to each of unit converters 3A–3D from outputs VA, VB and ITH of actual voltage vector selecting circuit 40 according to the following steps.

STEP 1: Decision of the kind of unit converter voltage vectors

Assuming that when ITH is smaller than 5,

J=ITH+1

K=ITH+2 when ITH is equal to 5,

J=ITH+1

K=1

Thus, numbers (J, K) are decided which represents the kind of the unit converter voltage vectors to be allocated.

STEP 2: Decision of the number of unit converter voltage vectors

It is assumed that the number of unit converter voltage vectors VJ is VA, and the number of unit converter voltage vectors VK is VB.

Here, J, K are integer values of 1–6 obtained in STEP 1. VJ, VK represent adjacent two vectors out of output voltage vectors V1–V6 that can be generated by unit converters 3A–3D shown in FIG. 4. VA, VB are coordinate values of the end point of selected actual voltage vector that are the outputs of actual voltage vector selecting circuit 40.

Hereinafter, simply assuming a case where J=1, K=2, VA=1, VB 32 3, that is, the number of voltage vectors are one for vector V1 and three for vector V2, and when present output voltage vectors of unit converters 3A–3D are as shown below will be explained:

Unit converter 3A: V1
  Unit converter 3B: V2
  Unit converter 3C: V2
  Unit converter 3D: V1

STEP 3: Generation of "unit converter voltage vector command set"

By sequentially arranging unit converter voltage vectors to be allocated to unit converters 3A–3D as described above, a "unit converter voltage vector command set" is made to be (V1, V2, V2, V2).

STEP 4: Decision of voltage vector to be allocated to each unit converter

As the present output voltage vector of unit converter 3A is V1 and voltage vector V1 is included in unit converter voltage vector command set (V1, V2, V2, V2), the next output voltage vector of unit converter 3A is made as V1 and voltage vector V1 is excluded from the unit converter voltage vector command set. As a result, the unit converter voltage vector command set will become (V2, V2, V2).

As the present output voltage vector of unit converter 3B is V2 and voltage vector V2 is included in unit converter voltage vector command set (V2, V2, V2), the next output voltage vector of unit converter 3B is made as V2 and voltage vector V2 is excluded from the unit converter voltage vector command set. As a result, the unit converter voltage vector command set will become (V2, V2).

As the present output voltage vector of unit converter 3C is V2 and voltage vector V2 is included in unit converter voltage vector command set (V2, V2), the next output voltage vector of unit converter 3C is made as V2 and voltage vector V2 is excluded from the unit converter voltage vector command set. As a result, the unit converter voltage vector command set will become (V2).

The present output voltage vector of unit converter 3D is V1 and voltage vector V1 is not included in unit converter voltage vector command set (V2). Voltage vector V2 left in unit converter voltage vector command set (V2) is allocated as the next output voltage vector for unit converter 3D.

In this example, only one vector is left in the unit converter voltage vector command set. If a plurality of voltage vectors are left in the unit converter voltage command set, the first vector is allocated.

As described above, in this example, unit converter voltage vector decision circuit 50 decides voltage vectors as follows:

Unit converter 3A: V1
  Unit converter 3B: V2
  Unit converter 3C: V2
  Unit converter 3D: V2

Based on the decision result, unit converter voltage vector decision circuit 50 outputs a unit converter voltage vector set (V1, V2, V2, V2).

ON/OFF pattern generating circuit 60 converts the unit converter voltage vector set, that is (V1, V2, V2, V2) in case of the above example, output by unit converter voltage vector decision circuit 50 to an ON/OFF pattern of each GTO according to the relation in Table showing the switching state of GTOs and voltage vectors.

An ON/OFF pattern of each GTO is sent to gate pulse generating circuit 21 to turn ON/OFF each GTO.

According to the first embodiment, for the command voltage vector that is determined according to AC system voltage that changes in sine wave state, the power conversion system is so controlled as to output an actual voltage vector that is near the command voltage vector. Therefore, it is possible to generate sine wave voltage at the primary side of transformer 1. Further, the converter switching operation is taken place only when the end point of a command voltage vector corresponding to a voltage command moves from a region including an actual voltage vector end point to another region including anther actual voltage vector end point. As a result, the switching operation can be suppressed to the minimum required, and a highly efficient power conversion system with reduced switching loss can be achieved.

Next, a second embodiment of the present invention will be described.

The construction and operations of the second embodiment of the present invention are the same as those in the first embodiment of this invention except actual voltage vector selecting circuit 40, and the explanation of the same components will be omitted here.

Hereinafter, actual voltage vector selecting circuit 40 in the second embodiment of the present invention will be described. FIG. 9 is a block diagram showing a detailed construction of an actual voltage vector selecting circuit 40 according to a second embodiment of this invention.

In FIG. 9, the operation to obtain coordinate values RVA2, RVB2 corresponding to the command voltage vector from outputs RVA, RVB of command voltage vector computing circuit 30 by way of phase angle calculating circuit 41, phase angle discriminating circuit 42, multiplier 43 and rotational transformation circuit 44 are the same as in the first embodiment.

FIG. 10 shows regular hexagonal regions that are divided to include an actual voltage vector end point by one that is used for actual voltage vector selection. When a command voltage vector end point is included in each region, an actual voltage vector positioned at the center of its region is decided to be a vector most close to the command voltage vector. Based on this region division, the process for performing the actual voltage vector selection will be described.

First, a coordinate transformation circuit 46 performs the conversion of coordinates of outputs RVA2, RVB2 of rotational transformation circuit 44 according to the following equations.

$$P = 2 \times RVA2$$

$$Q = RVA2 + \sqrt{3} \times RVB2$$

Coordinate values (P, Q) are corresponding to directional components of two voltage vectors forming a 60° section including the end point of the command voltage vector.

A region computing circuit 47 computes a region wherein the end point of the command voltage vector exists according to the following equations based on coordinate values (P, Q).

$$IP = INT(P)$$

$$IQ = INT(Q)$$

$$IR = INT(Q - IQ - P + IP + 1)$$

INT (*) in the above equations represents the truncate operation to integers

A value (IP, IQ, IR) corresponds to one of regular triangle regions (FIG. 11) one by one that is decided by connecting the end point of the actual voltage vector at the center of a regular hexagonal region shown in FIG. 10 and each of the apexes of the regular hexagonal region. Therefore, a regular triangle region wherein the end point of the command voltage vector exists is computed by the above computation.

An actual voltage vector coordinate computing circuit 48 computes coordinate values VA and VB of actual voltage vector by referring to an actual voltage vector coordinate data table 49 shown in FIGURE 11A based on coordinate values (IP, IQ, IR). Actual voltage vector selecting circuit 40 shown in FIG. 9 outputs signals VA, VB and ITH to unit converter voltage vector decision circuit 50 as a selected actual voltage vector.

Figure 11:
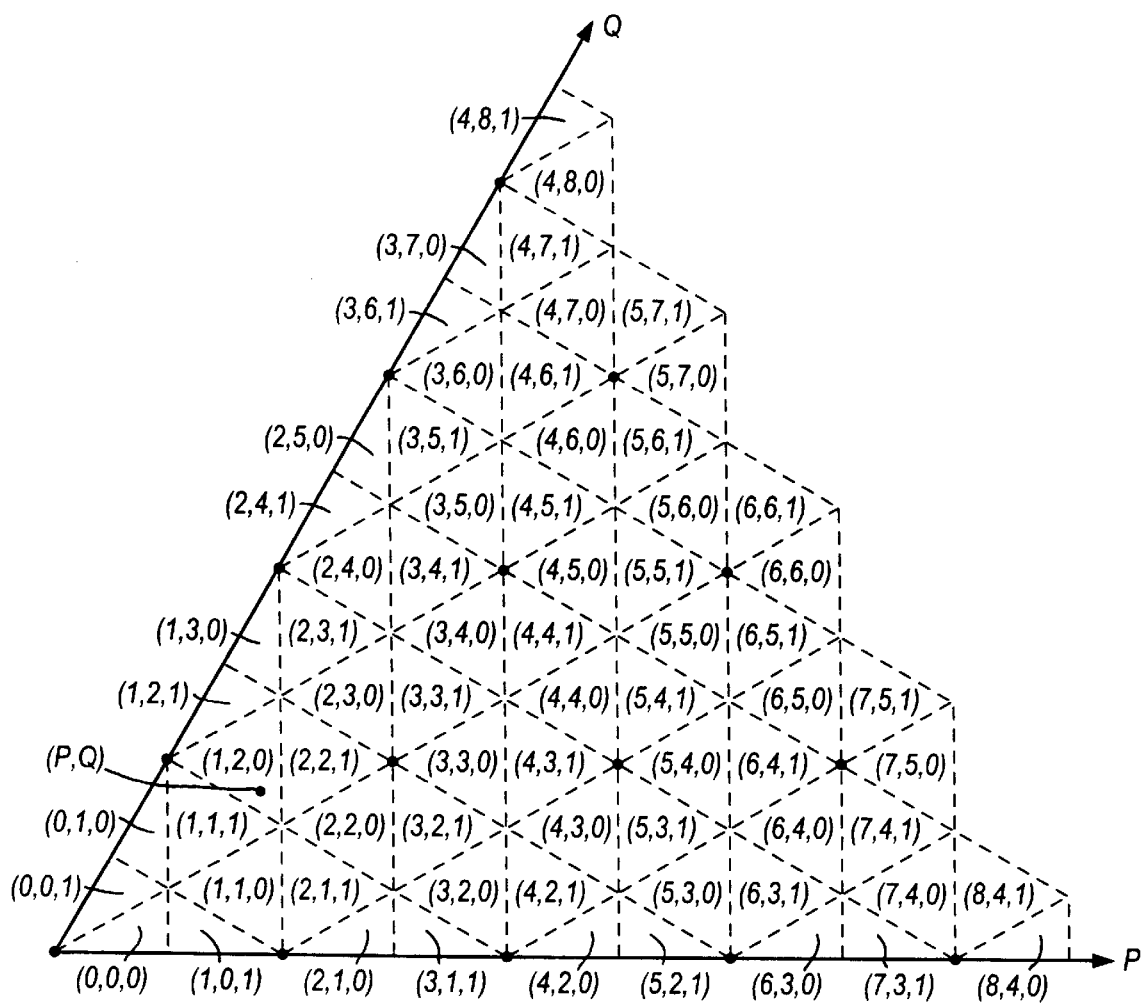
FIG. 11 is a diagram for explaining the operation of region computing circuit 47 in the second embodiment.

One example will be described below. It is assumed that a command voltage vector (RVA2, RVB2) is as shown in FIG. 10. Coordinate value (P, Q) corresponding to this command voltage vector is shown in FIG. 11. Coordinate values (IP, IQ, IR), in this case (1, 2, 0), is obtained as shown in FIG. 11. By referring to actual voltage vector date table 49 shown in FIG. 11A based on coordinate values (1, 2, 0), coordinate values (VA, VB), in this case (0, 1), of actual voltage vector is output as a selected actual voltage vector from actual voltage vector coordinate computing circuit 48.

Thereafter, GTOs of each unit converter are turned ON/OFF via unit converter voltage vector decision circuit 50, ON/OFF pattern generating circuit 60 and gate pulse generating circuit 21 likewise in the first embodiment. As a result, sine wave voltage corresponding to system voltage is generated on primary winding 1P of transformer 1 likewise the first embodiment.

Figure 12:
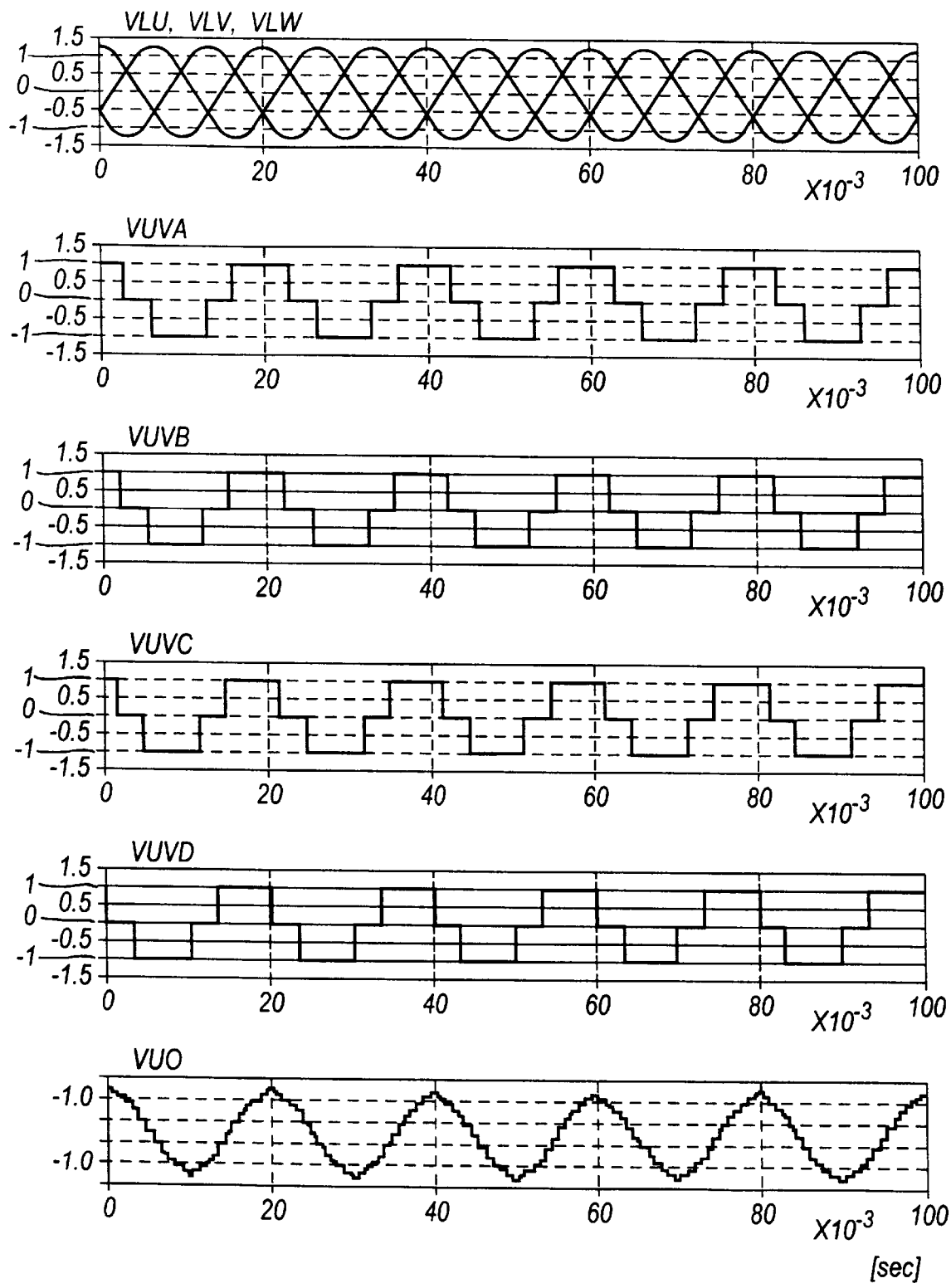
FIG. 12 is a waveforms diagram for explaining the operation of the second embodiment shown in FIG. 9.

FIG. 12 shows operating waveforms of the power conversion system according to this embodiment. In FIG. 12, in each of waveforms, the horizontal axis shows the time measured by second and the vertical axis shows the voltage measured by power unit (PU).

VLU, VLV, VLW are U-phase, V-phase, W-phase voltage waveforms, VUVA–VUVD are respectively UV-phase output voltages of unit converters 3A–3D, and VUO is a waveform added with voltages VUVA–VUVD. Voltage VUO corresponds to a phase voltage generated on primary winding 1P of transformer 1, and it is seen from the waveform of phase voltage VUO that a sine wave voltage is generated. Further, each GTO of unit converters 3A–3D performs one switching operation for one cycle and the number of switching is kept minimum. It is noted that in FIG. 12, the waveforms shows the operation when the output of the current control system is zero. When the current control system (current control circuit 17) is operated as described in the embodiment, the PWM operation is added and the switching becomes slightly different.

According to the second embodiment of the present invention, the power conversion system is so controlled that an actual voltage vector that is most close to the command voltage vector that is determined according to AC system voltage that changes in the form of sine wave is output. Therefore, it is possible to generate sine wave voltage at the primary side of transformer 1. Further, when regular hexagonal regions dividing actual voltage vectors are considered, an actual voltage vector that is most close to a command voltage vector can be computed at a high speed requiring no complicated distance computation. The switching operation of the converters is taken place only when the end point of a command voltage vector corresponding to a voltage command moves from a regular hexagonal region including the end point of an actual voltage vector to another regular hexagonal region. As a result the switching operation can be suppressed to the minimum required and a highly efficient power conversion system with reduced switching loss can be achieved.

Next, a third embodiment of the present invention will be described.

The construction and operations of the third embodiment of this invention are the same as those in the first embodiment except actual voltage vector selecting circuit 40, and the explanation of the same components will be omitted here.

Figure 13:
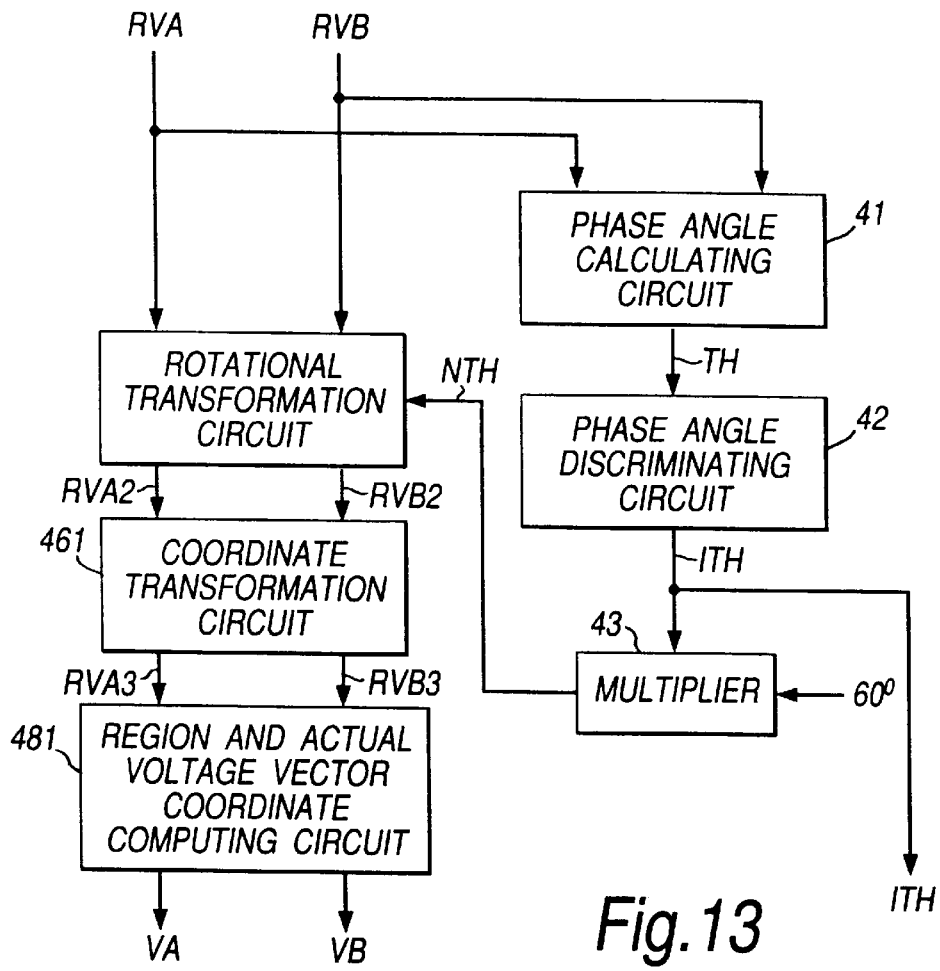
FIG. 13 is a block diagram showing a detailed construction of an actual voltage vector selecting circuit 40 according to a third embodiment of this invention.

Hereinafter, actual voltage vector selecting circuit 40 in the third embodiment of the present invention will be described. FIG. 13 is a block diagram showing a detailed construction of an actual voltage vector selecting circuit 40 according to a third embodiment of this invention.

In FIG. 13, the operation to obtain coordinates RVA2, RVB2 corresponding to the command voltage vector from outputs RVA, RVB of command voltage vector computing circuit 30 by way of phase angle calculating circuit 41, phase angle discriminating circuit 42, multiplier 43 and rotational transformation circuit 44 are the same as in the first embodiment.

Figure 14:
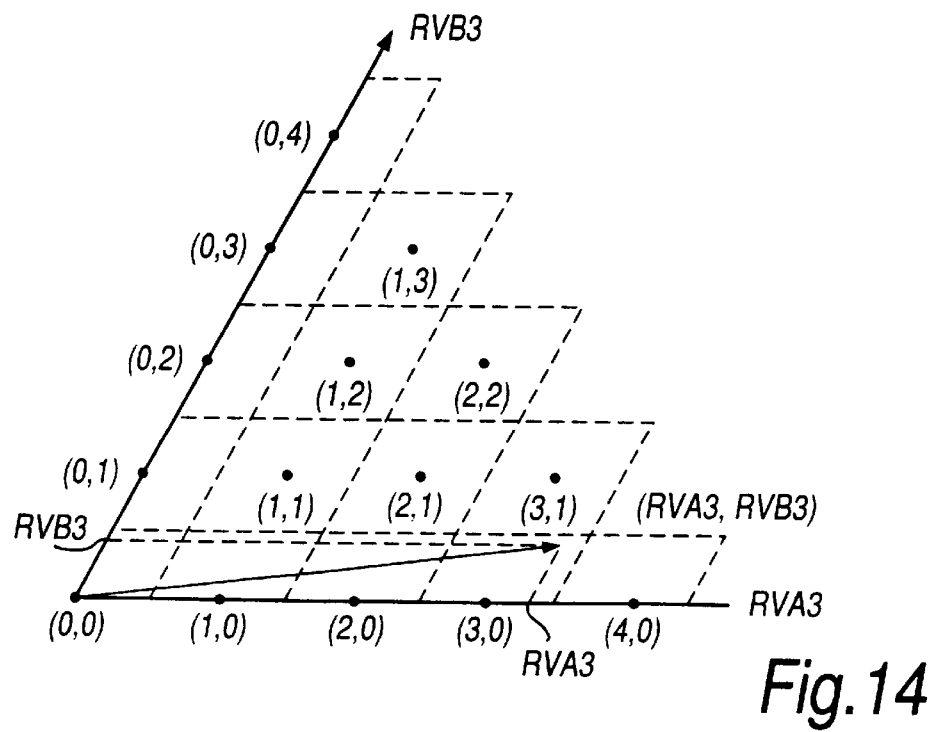
FIG. 14 is a diagram showing divided regions of actual voltage vectors used in the third embodiment.

FIG. 14 shows rhombic regions that are divided to include one end point of an actual voltage vector by one for use in selection of an actual voltage vector. When the end point of a command voltage vector is contained in each region, an actual voltage vector positioned at the center of its region is decided to be a vector most close to the command voltage vector. Based on this region division, the process for performing the actual voltage vector selection will be described.

First, a coordinate transformation circuit 461 performs the coordinate transformation of outputs RVA2, RVB2 of rotational transformation circuit 44 according to the following equations.

$$RVA3 = RVA2 - (1/\sqrt{3}) \times RVB2$$

$$RVB3 = (2/\sqrt{3}) \times RVB2$$

Two straight lines are determined in the direction of two voltage vectors forming a 60° section containing the end point of command voltage vector.

Coordinate values (RVA3, RVB3) are equivalent to distances from the origin to the intersecting points decided by drawing straight lines in parallel with the above-described two straight lines in the voltage vector direction from the end point of the command voltage vector.

A region and actual voltage vector coordinate computing circuit 481 computes actual voltage vector coordinate values VA, VB according to the following equations.

$$VA = INT(RVA3 + 0.5)$$

$$VB = INT(RVB3 + 0.5)$$

INT (*) in the above equations represent the truncate operation to integers. Actual voltage vector selecting circuit 40 shown in FIG. 13 outputs signals VA, VB and ITH to unit converter voltage vector decision circuit 50 as a selected actual voltage vector.

One example will be described below. It is assumed that coordinate values (RVA3, RVB3) corresponding to a voltage command value (RVA2, RVB2) is as shown in FIG. 14. Coordinate values (VA, VB), in this case (3, 0), of actual voltage vector is obtained as shown in FIG. 14, which is output as a selected actual voltage vector from region and actual voltage vector computing circuit 481.

Thereafter, GTOs of each unit converter are turned ON/OFF via unit converter voltage vector decision circuit 50, ON/OFF pattern generating circuit 60 and gate pulse generating circuit 21 likewise in the first embodiment. As a result, sine wave voltage corresponding to system voltage is generated on primary winding 1P of transformer 1 likewise the first embodiment.

According to the third embodiment of the present invention, as the power conversion system is controlled so as to output an actual voltage vector close to the command voltage vector that is decided according to AC system voltage that changes to sine wave shape. Therefore, sine wave voltage can be generated at the primary side of transformer 1. Further, when rhombic regions dividing actual voltage vectors are considered, an actual voltage vector corresponding to a command voltage vector can be computed at a high speed requiring no complicated distance computation nor a data table. Further, when rhombic regions are used, even if an amplitude of the command voltage vector changes minutely, a switching pattern obtained correspondingly changes and a good current control characteristic is obtained.

Further, the switching operation of the converters is taken place only when the end point of a command voltage vector corresponding to a voltage command moves from a rhombic region including the actual voltage vector end point to another rhombic region. As a result, the switching operation can be suppressed to the minimum required and a highly efficient power conversion system with reduced switching loss can be achieved.

Next, a fourth embodiment of the present invention will be described.

Figure 15:
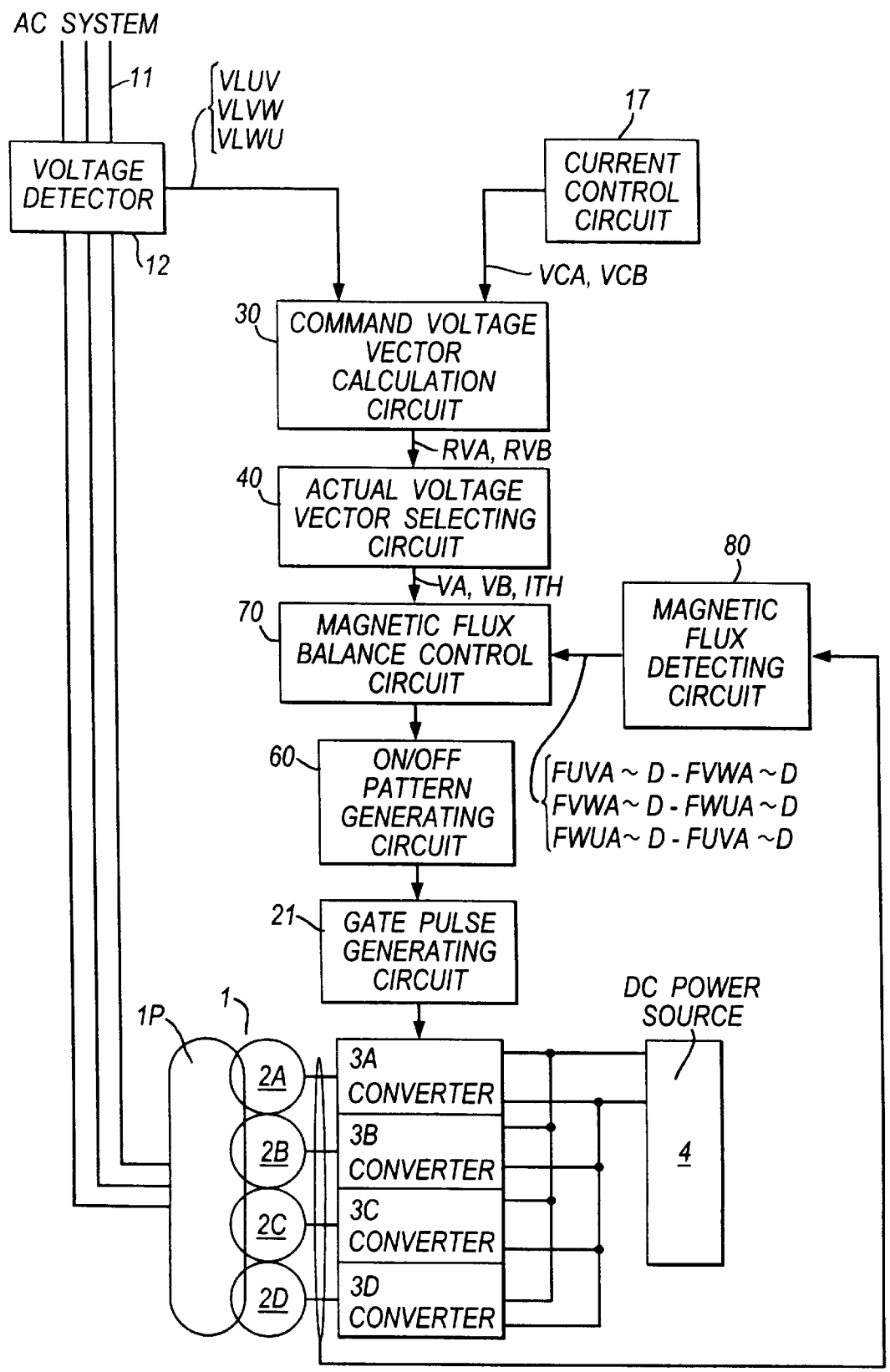
FIG. 15 is a block diagram showing a control system for a power conversion system according to a fourth embodiment of this invention.

FIG. 15 is a block diagram showing the construction of a control system for a power conversion system according to a fourth embodiment of this invention.

In FIG. 15, 70 is a magnetic flux balance control circuit to control such that magnetic fluxes interlinking transformer secondary windings 2A through 2D are balanced. 80 is a magnetic flux detection circuit to detect quantities equivalent to magnetic fluxes interlinking transformer secondary windings 2A through 2D.

Figure 16:
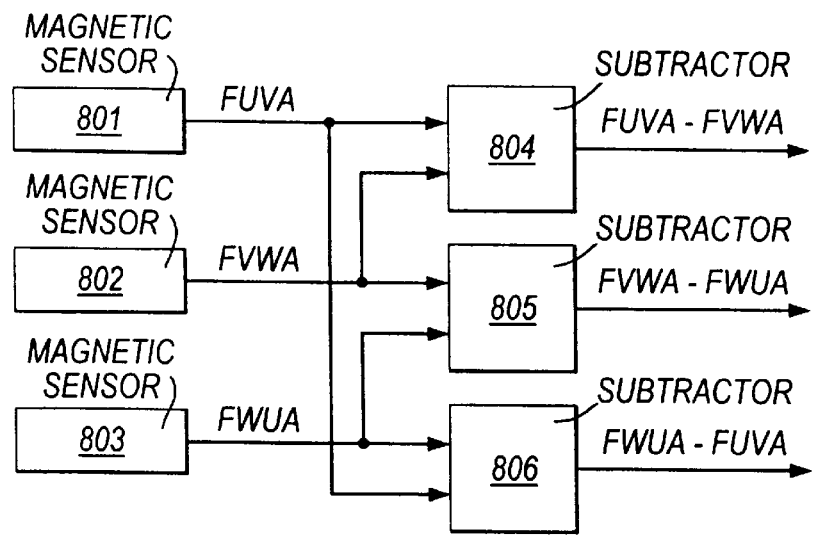
FIG. 16 is a block diagram showing a detailed construction of a part of a magnetic flux detecting circuit 80 in the fourth embodiment shown in FIG. 15.

FIG. 16 is a block diagram showing the construction of a part of magnetic flux detecting circuit 80 shown in FIG. 15. In FIG. 16, magnetic flux detecting circuit 80 is composed of magnetic sensors 801, 802 and 803 to detect quantities FUVA, FVWA and FWUA which are equivalent to magnetic fluxes of UV-phase, VW-phase and WU-phase of secondary winding 2A in transformer 1, respectively. Magnetic flux detecting circuit 80 is further composed of subtractors 804, 805 and 806 to compute differences FUVA–FVWA, FVWA–FWUA and FWUA–FUVA, respectively, which are applied to magnetic flux balance control circuit 70.

This figure only shows the construction with respect to secondary winding 2A of transformer 1, and the construction with respect to secondary windings 2B–2D of transformer 1 should be made in the same manner.

Next, the operations of the fourth embodiment will be described. In FIG. 15, the operations up to the selection of actual voltage vector (VA, VB) to be output by actual voltage vector selecting circuit 40 are the same as those in the first embodiment and therefore, the explanation thereof will be omitted here.

Magnetic flux balance control circuit 70 first decides the order in the sizes of quantity FUVA–FVWA equivalent to the difference between UV-phase magnetic flux and VW-phase magnetic flux, quantity FVWA–FWUA equivalent to the difference between VW-phase magnetic flux and WU-phase magnetic flux and quantity FWUA–FUVA equivalent to the difference between WU-phase magnetic flux and UV-phase magnetic flux. Magnetic flux balance control circuit 70 computes a unit converter voltage vector command set, such as (V1, V2, V2, V2), to be output from each unit converter from the outputs VA, VB and ITH of actual voltage vector selecting circuit 40 in the same manner as explained in unit converter voltage vector decision circuit 50 in the first embodiment. Then, according to the following logic, a unit converter voltage vector set to be output from each unit converter is allocated to each unit converters 3A–3D.

STEP 0: Check the first voltage vector of the unit converter voltage vector command set, and if the unit converter voltage command set is empty, terminate the operation. Or, if the first voltage vector of the unit converter voltage vector command set is voltage vector V0, allocate voltage vector V0 to remaining unit converters to which no voltage vector is allocated and terminate the operation.

STEP 1: When ITH is the same as that at the time of preceding unit converter voltage vector allocation, check the first vector of the unit converter voltage vector command set, and if there is the same voltage vector in the present allocated voltage vectors, the next output of that unit converter is made the same voltage vector and exclude that voltage vector from the unit converter voltage vector command set.

STEP 2: When ITH is changed from that at the time of preceding unit converter voltage vector, the allocation is described below.

2-1) Check a first vector in the unit converter voltage vector command set and if that vector is V1, allocate voltage vector V1 to a converter having the minimum value among quantities FUVA–FWUA, FUVB–FWUB, FUVC–FWUC, FUVD–FWUD that are equivalent to respective differences between UV-phase magnetic flux and WU-phase magnetic flux interlinking to secondary windings 2A–2D, among converters 3A–3D.

2-2) If that vector is V2, allocate voltage vector V2 to a converter having the minimum value among quantities FVWA–FWUA, FVWB–FWUB, FVWC–FWUC, FVWD–FWUD that are equivalent to respective differences between VW-phase magnetic flux and WU-phase magnetic flux interlining to secondary windings 2A–2D, among converters 3A–3D.

2-3) If that vector is V3, allocate voltage vector V3 to a converter having the minimum value among quantities FVWA–FUVA, FVWB–FUVB, FVWC–FUVC, FVWD–FUVD that are equivalent to respective differences between VW-phase magnetic flux and UV-phase magnetic flux interlinking to secondary windings 2A–2D, among converters 3A–3D.

2-4) If that vector is V4, allocate voltage vector V4 to a converter having the minimum value among quantities FWUA–FUVA, FWUB–FUVB, FWUC–FUVC, FWUD–FUVD that are equivalent to respective differences between WU-phase magnetic flux and UV-phase magnetic flux interlinking to secondary windings 2A–2D, among converters 3A–3D.

2-5) If that vector is V5, allocate voltage vector V5 to a converter having the minimum value among quantities FWUA–FVWA, FWUB–FVWB, FWUC–FVWC, FWUD–FVWD that are equivalent to respective differences between WU-phase magnetic flux and VW-phase magnetic flux interlinking to secondary windings 2A–2D, among converters 3A–3D.

2-6) If that vector is V6, allocate voltage vector V6 to a converter having the minimum value among quantities FUVA–FVWA, FUVB–FVWB, FUVC–FVWC, FUVD–FVWD that are equivalent to differences between UV-phase magnetic flux and VW-phase magnetic flux interlinking to secondary windings 2A–2D, among converters 3A–3D.

2-7) When that vector in the unit converter voltage vector command set is allocated to one of converters 3A–3D, the three quantities equivalent to respective three differences between UV-phase and VW-phase, VW-phase and WU-phase, and WU-phase and UV-phase magnetic fluxes in one of the secondary windings 2A–2D of the converter to which the voltage vector has been allocated are deleted from each of three orders decided by magnetic flux balance control circuit 70. Then, that vector allocated to one of converters 3A–3D is deleted from the unit converter voltage vector command set.

STEP 3: Return to STEP 0.

The operation of magnetic flux balance control circuit 70 is further described in detail with reference to an example.

It is assumed that unit converter voltage vector command set (V1,V1,V4,V5) is generated in magnetic flux balance control circuit 70 based on output signal (VA, VB, ITH) of actual voltage vector selecting circuit 40. It is further assumed that ITH is changed from that at the time of preceding unit converter vector.

Firstly, a first voltage vector in the unit converter voltage vector command set (V1,V1,V4,V5) is checked. A first voltage vector in the unit converter voltage vector command set (V1,V1,V4,V5) is voltage vector V1. In step 2-1), it is assumed that quantity FUVB–FVWB is minimum, and then voltage vector V1 is allocated to converter 3B. In step 2-7), quantities FUVB–FVWB, FVWB–FWUB and FWUB–FUVB with respect to secondary winding 2B are deleted from each of three orders decided by magnetic flux balance control circuit 70. Then, voltage vector V1 is deleted from the unit converter voltage vector command set (V1,V1,V4,V5), and the unit converter voltage vector command set becomes (V1,V4,V5) Secondly, a first voltage vector in the unit converter voltage vector command set (V1,V4,V5) is checked. A first voltage vector in the unit converter voltage vector command set (V1,V4,V5) is also voltage vector V1. In step 2-1), it is further assumed that quantity FUVD–FVWD is minimum, and then voltage vector V1 is allocated to converter 3D. In step 2-7), quantities FUVD–FVWD, FVWD–FWUD and FWUD–FUVD with respect to secondary winding 2D are deleted from each of three orders decided by magnetic flux balance control circuit 70. Then, voltage vector V1 is deleted from the unit converter voltage vector command set (V1,V4,V5), and the unit converter voltage vector command set becomes (V4,V5).

Thirdly, a first voltage vector in the unit converter voltage vector command set (V4,V5) is checked. A first voltage vector in the unit converter voltage vector command set (V4,V5) is voltage vector V4. In step 2-4), it is further assumed that quantity FWUC–FVWC is minimum, and then voltage vector V4 is allocated to converter 3C. In step 2-7), quantities FUVC–FVWC, FVWC–FWUC and FWUC–FUVC with respect to secondary winding 2C are deleted from each of three orders decided by magnetic flux balance control circuit 70. Then, voltage vector V4 is deleted from the unit converter voltage vector command set (V4,V5), and the unit converter voltage vector command set becomes (5).

Fourthly, a first voltage vector in the unit converter voltage vector command set (V5) is checked. A first voltage vector in the unit converter voltage vector command set (V5) is voltage vector V5. In step 2-5), quantity FWUA–FVWA is left and minimum, so that voltage vector V5 is allocated to converter 3A.

As described above, in this example, voltage vectors V5, V1, V4 and V1 are respectively allocated to converters 3A, 3B, 3C and 3D from the unit converter voltage vector command set (V1,V1,V4,V5)

As described above, the unit converter voltage vector set to be output from each unit converter is determined by magnetic flux balance control circuit 70. As is clear from the above-description, magnetic flux balance control circuit 70 is provided with the function of unit converter voltage vector decision circuit 50 in the first embodiment.

Then ON/OFF pattern generating circuit 60 converts the unit converter voltage vector set that is output by magnetic flux balance control circuit 70 to the ON/OFF pattern of each GTO.

The ON/OFF pattern of each GTO is sent to gate pulse generating circuit 21 to turn each GTO ON/OFF.

Figure 17:
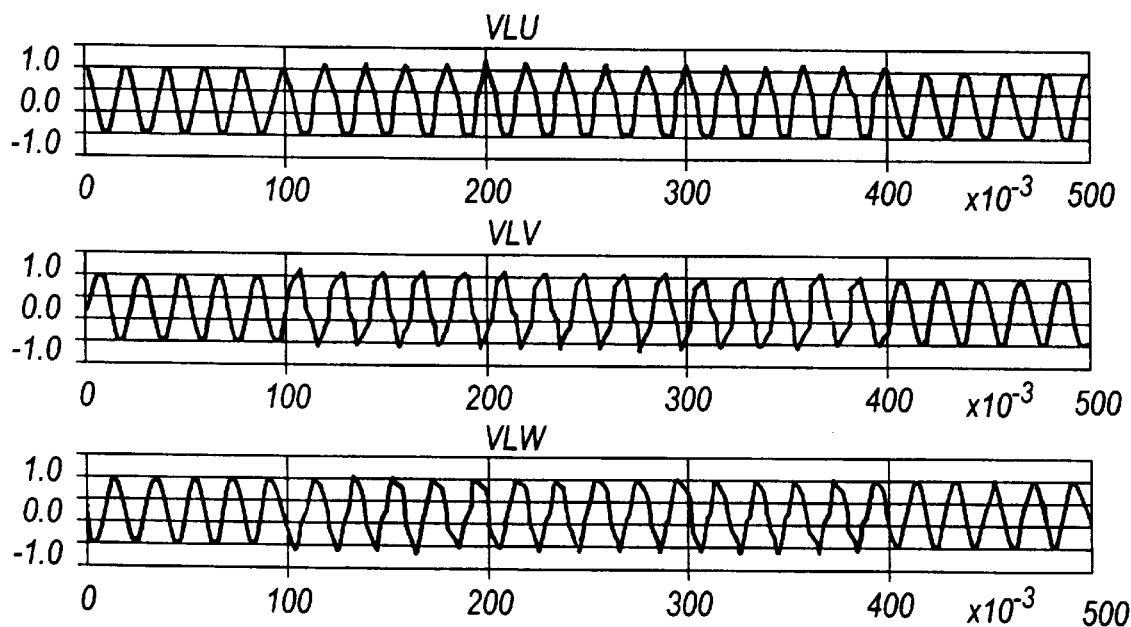
FIG. 17 is a waveforms diagram for explaining the operation of the fourth embodiment shown in FIG. 15.
Figure 17:
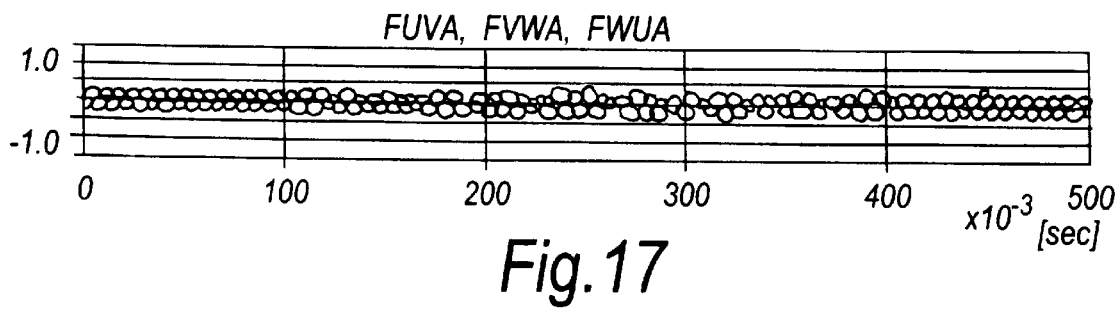

FIG. 17 shows the operating waveforms in this embodiment when system voltage is distorted by higher harmonics due to system failure, etc. In FIG. 17, VLU, VLV, VLW represent system phase voltages and FUVA, FVWA, FWUA represent quantities equivalent to magnetic fluxes of first stage unit converters 3A, respectively. As a voltage vector of a unit converter is decided according to the quantity of the magnetic flux, even if the system voltage is distorted largely as shown in FIG. 17 (100~400×10$^{-3}$ sec), the magnetic flux is controlled at a level below a certain value.

According to the fourth embodiment of the present invention, for the voltage command vector that is decided according to AC system voltage that changes in sine wave state, the power conversion system is so controlled as to output an actual voltage vector that is near the command voltage vector. Therefore, sine-wave voltage can be generated at the primary side of transformer 1. Further, the switching operation of converters is taken place only when the end point of a command voltage vector corresponding to a voltage command moves from a region including an end point of the actual voltage vector to another region including the end point of another actual voltage vector. As a result, it is possible to suppress the switching operation to the minimum required and a highly efficient power conversion system with reduced switching loss can be achieved. Further, as it is controlled such that the magnetic fluxes interlinking to the secondary windings of the transformer are balanced between the unit converters based on the quantities corresponding to the magnetic fluxes, it is also possible to control voltages applied to the secondary windings so that no DC component is generated in these voltages. Therefore, even if system voltage is distorted largely due to system failure, etc. the power conversion system can be continuously operated without saturating the transformer.

Next, a fifth embodiment of the present invention will be described.

The fifth embodiment of this invention is the same as the second embodiment of the present invention added with the same magnetic flux detecting circuit 80 and the same magnetic flux balance control circuit 70 as in the fourth embodiment of the present invention, instead of unit converter voltage vector decision circuit 50.

According to the fifth embodiment of the present invention, the power conversion system is so controlled as to output an actual voltage vector most close to the command voltage vector that is decided according to AC system voltage that changes in sine wave shape. Therefore, sine wave voltage can be generated at the primary side of transformer 1. Further, when regular hexagonal regions dividing actual voltage vector are considered, it is possible to compute an actual voltage vector that is most close to a command voltage vector at a high speed without performing a complicated distance computation. The switching operation of the converters is taken place only when the end point of a command voltage vector corresponding to a voltage command moves from a regular hexagonal region including the end point of an actual voltage vector to another regular hexagonal region. As a result, the switching operation can be suppressed to the minimum required and a highly efficient power conversion system with reduced switching loss can be achieved. Further, as it is controlled such that magnetic fluxes interlinking to the secondary windings of the transformer are balanced between the unit converters, based on the quantities corresponding to magnetic fluxes, it is also possible to control voltages applied to the secondary windings so that no DC component is generated in these voltages. Therefore, even if system voltage is distorted largely due to system failure, etc., the power conversion system can be continuously operated without saturating the transformer.

Next, a sixth embodiment of the present invention will be described.

The sixth embodiment of the present invention is the same as the third embodiment of the present invention added with the same magnetic flux detecting circuit 80 and the same magnetic flux balance control circuit 70 as that in the fourth embodiment of the present invention, instead of unit converter voltage vector decision circuit 50.

According to the sixth embodiment of the present invention, as the power conversion system is so controlled as to output an actual voltage vector close to the command voltage vector that is decided according to AC system voltage that changes in sine wave shape. Therefore it is possible to generate sine wave voltage at the primary side of transformer 1. Further, when rhombic regions dividing actual voltage vectors are considered, it is possible to compute an actual voltage vector corresponding to a voltage command vector at a high speed requiring no complicated distance computation nor data table. Further, when rhombic regions are used, even when an amplitude of the command voltage vector changes minutely, a switching pattern obtained therefrom changes accordingly and a good current control characteristic is obtained.

Further, the switching operation of the converters is taken place only when the end point of a command voltage vector corresponding to a voltage command moves from a rhombic region including the end point of the actual voltage vector to another rhombic region. As a result, it is possible to suppress the switching operation to the minimum required and a highly efficient power conversion system with reduced switching loss can be achieved. Further, as it is controlled such that based on the quantities corresponding to the magnetic fluxes interlinking to the secondary windings of the transformer the magnetic fluxes interlinking to the secondary windings of the transformer are balanced between the unit converters, it is also possible to control voltages applied to the secondary windings so that no DC component is generated in these voltages. Therefore, even if system voltage is distorted largely due to system failure, etc., it is possible to operate the power conversion system continuously without saturating the transformer.

In the above, as means to detect quantities equivalent to magnetic fluxes interlinking to the secondary windings of a transformer, a system using magnetic sensors is described. But as means to detect quantities equivalent to magnetic fluxes interlinking to the secondary windings of a transformer, other systems described below may be used.

Figure 18:
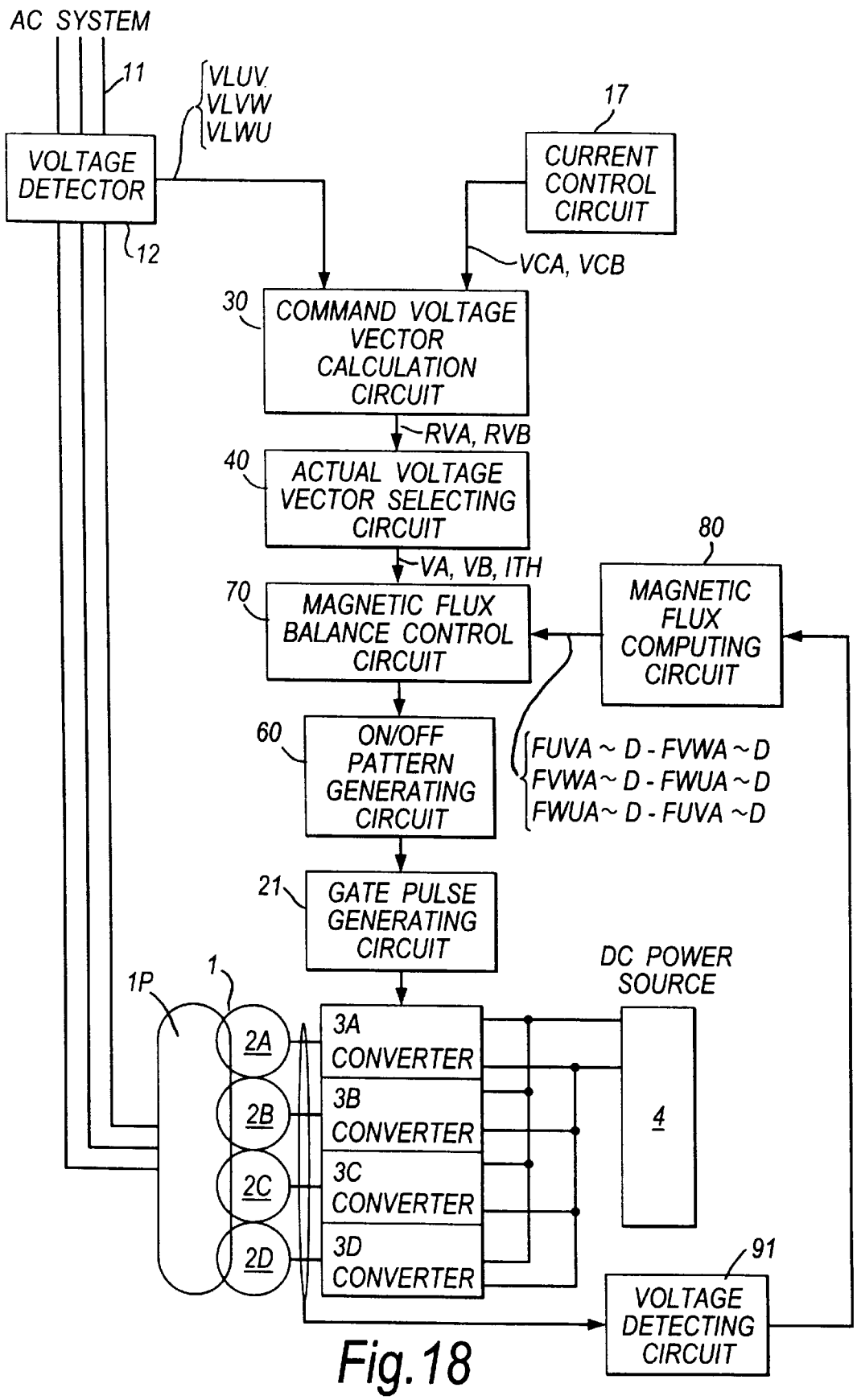
FIG. 18 is a block diagram showing a control system for a power conversion system according to a seventh embodiment of this invention.

Next, a seventh embodiment of the present invention will be described. FIG. 18 is a block diagram showing the construction of a control system for a power conversion system according to a seventh embodiment of this invention.

In FIG. 18, a voltage detecting circuit 91 detects voltages applied to respective phase windings of secondary windings 2A–2D of transformer 1. A magnetic flux computing circuit 92 includes incomplete integrator for integrating these voltages incompletely. Time constant of the incomplete integration is to be set at the vanishing characteristic of magnetic fluxes interlinking to secondary windings 2A–2D of transformer 1. Thus, quantities equivalent to magnetic fluxes interlinking to secondary windings 2A–2D of transformer 1, such as FUVA, FVWA, FWVA are obtained. Magnetic flux computing circuit 92 further includes subtractors to obtain the differences between these quantities, such as FUVA–FVWA, FVWA–FWUA, FWUA–FUVA, which are applied to magnetic flux balance control circuit 70 in FIG. 18.

According to this embodiment, it is possible to obtain quantities equivalent to magnetic fluxes interlinking to secondary windings of transformer 1 using voltage detectors and incomplete integrators that are installed more easily than magnetic sensors, and obtain the effects as described in the fourth to sixth embodiments.

Figure 19:
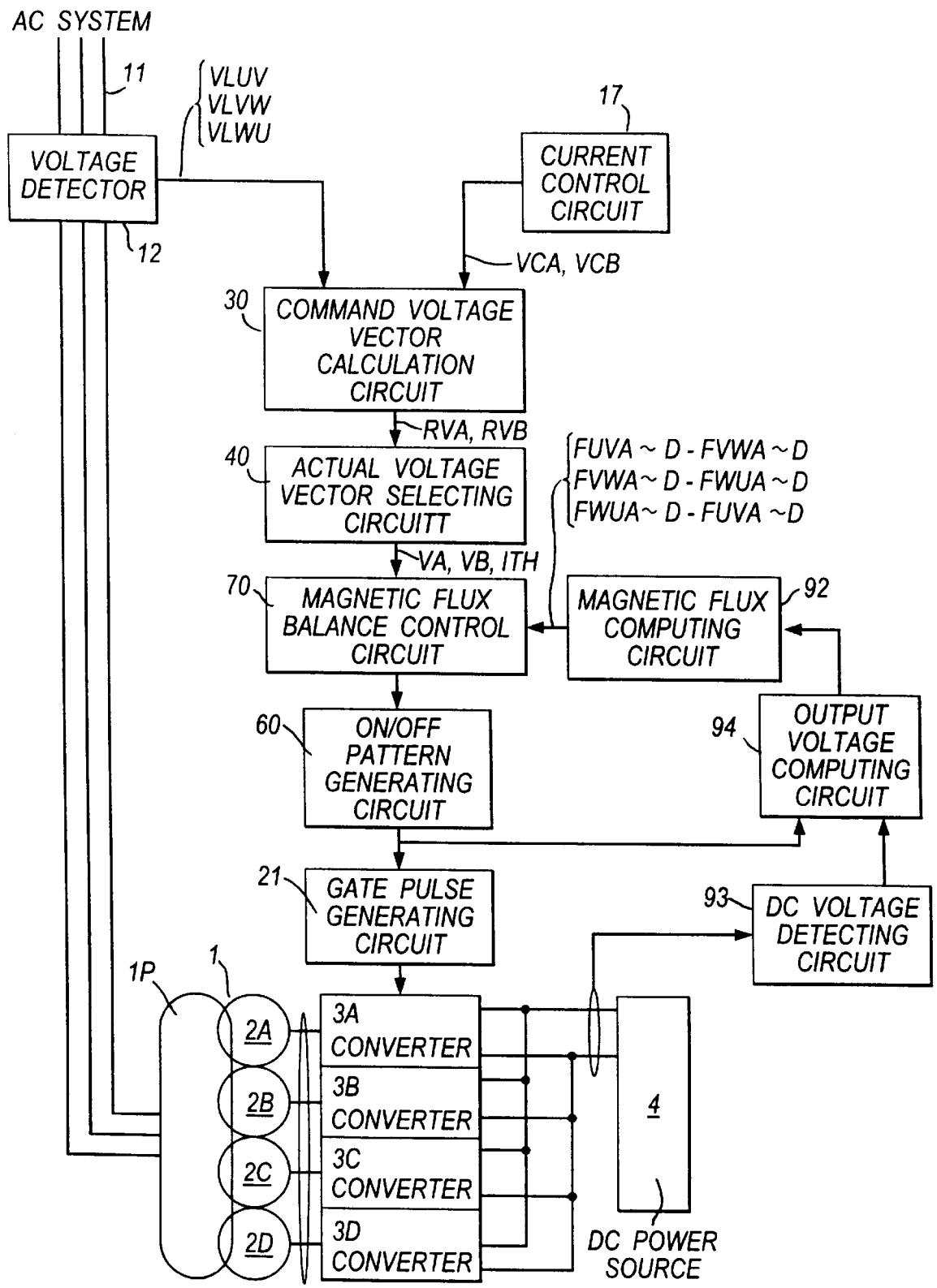
FIG. 19 is a block diagram showing a control system for a power conversion system according to an eighth embodiment of this invention.
Figure 20:
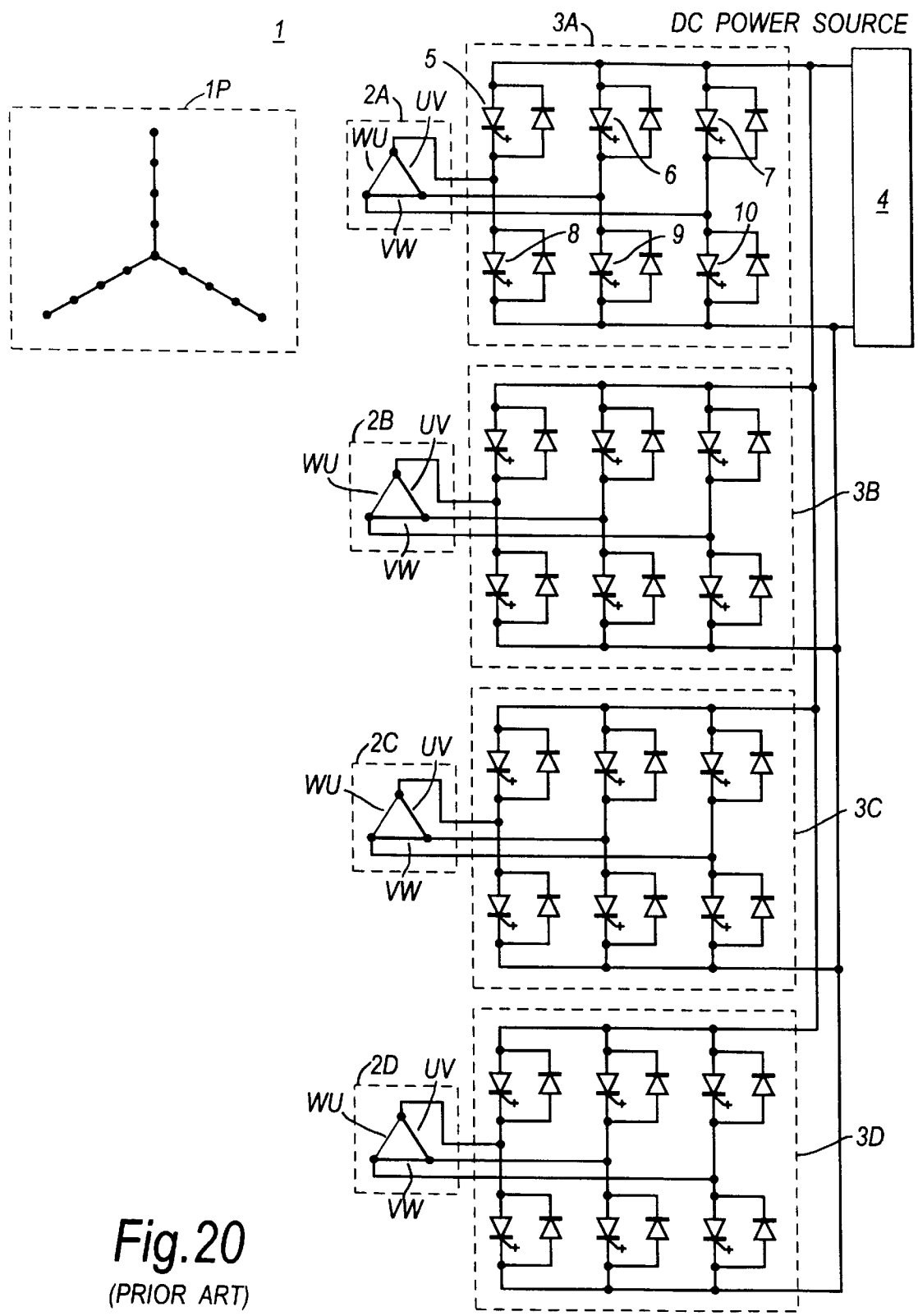
FIG. 20 is a block diagram showing a main circuit of a conventional power conversion system to which this invention is applied.
Figure 21:
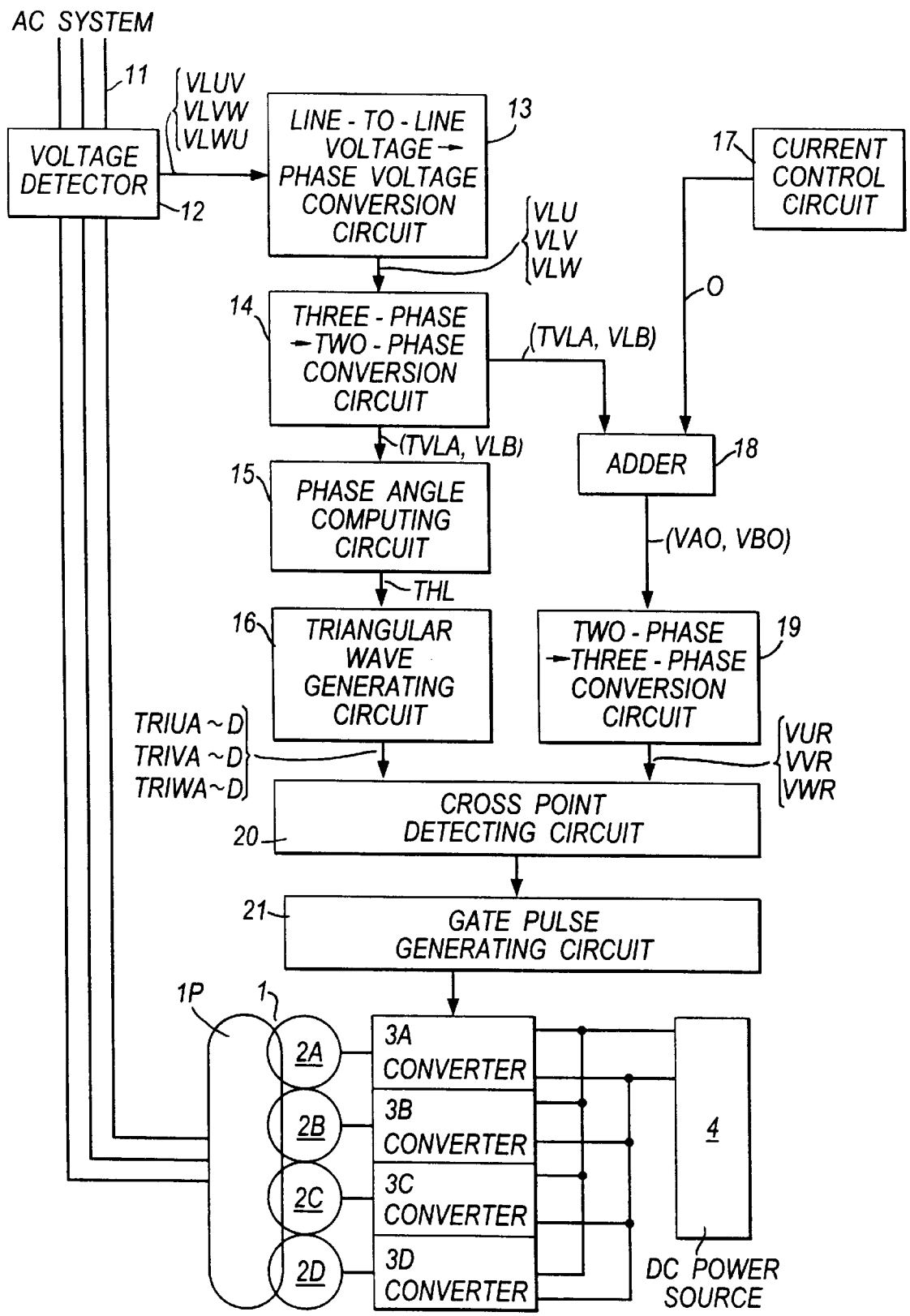
FIG. 21 is a block diagram showing a conventional control system for the power conversion system shown in FIG. 20.
Figure 22:
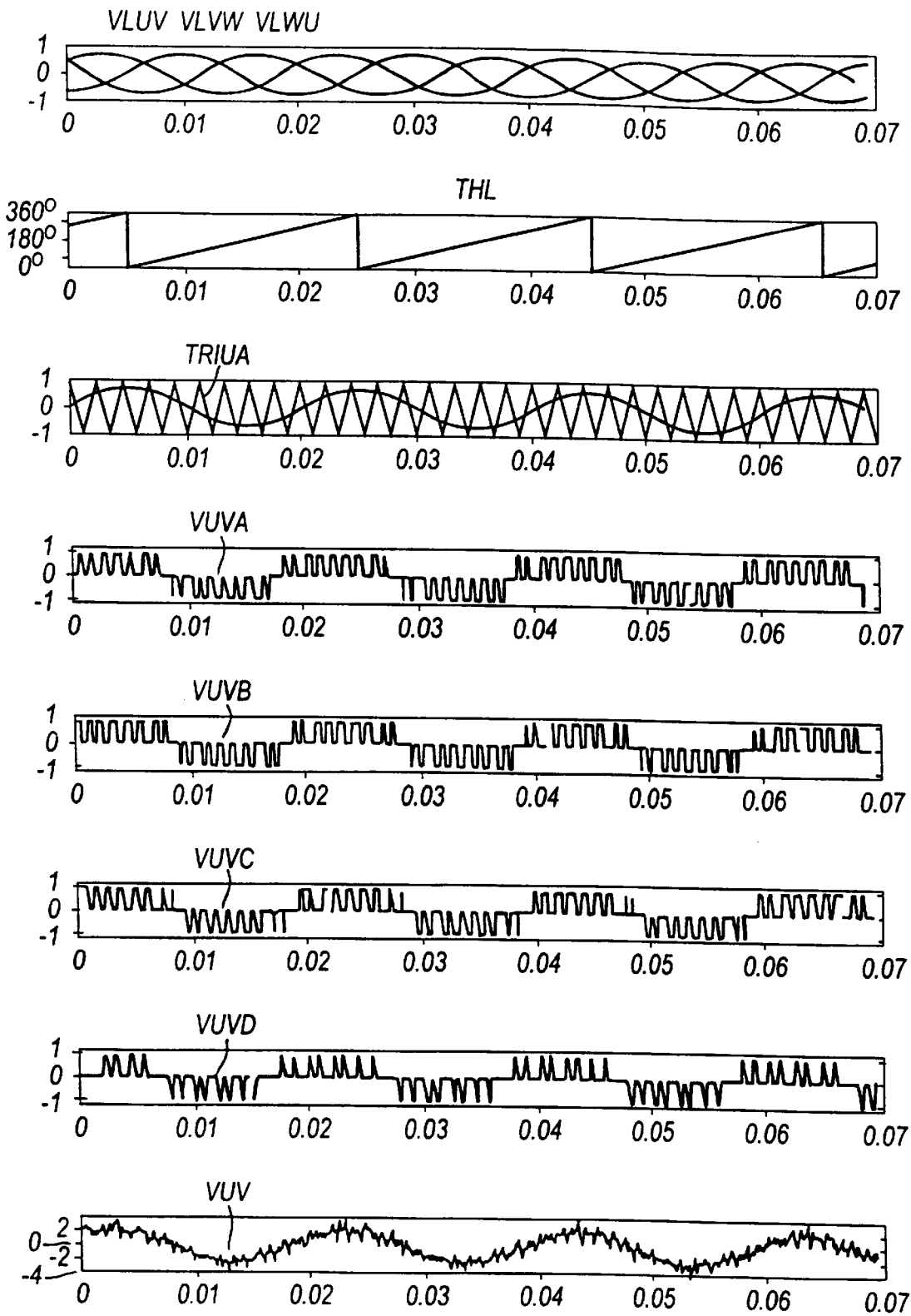
FIG. 22 is a waveforms diagram for explaining the operation of the conventional control system shown in FIG. 20.

Next, an eighth embodiment of the present invention will be described. FIG. 19 is a block diagram showing the construction of a control system for a power conversion system according to an eighth embodiment of this invention.

In FIG. 19, a DC voltage detecting circuit 93 detects an output voltage of DC power source 4. An output voltage computing circuit 94 computes voltages applied to respective phase windings of secondary windings 2A–2D of transformer 1 from the output of DC voltage detecting circuit 93 and the switching pattern that is the output of ON/OFF pattern generating circuit 60. The computed result is sent to magnetic flux computing circuit 92 and quantities equivalent to magnetic fluxes interlinking to transformer secondary windings 2A–2D, such as FUVA, FWA, FWUA, are computed. Magnetic flux computing circuit 92 further includes subtractors to obtain the differences between these quantities, such as FUVA–FVWA, FVWA–FWUA, FWUA–FUVA, which are applied to magnetic flux balance control circuit 70 in FIG. 19.

According to this embodiment, it is possible to compute quantities equivalent to the magnetic fluxes using DC voltage detectors which are normally already installed for DC voltage control. As a result, it is possible to obtain the effects as described in the fourth to sixth embodiments without requiring new installation of voltage detectors.

Further, if the DC voltage control for controlling DC voltage of DC power source 4 has sufficiently fast response, DC voltage command value may be used for DC voltage detected value.

As described above, according to the present invention, in a power conversion system composed of a transformer with its secondary windings connected to AC terminals of a plurality of unit converters and its primary winding connected in series for each phase to take out the output, as AC system voltage at the primary winding of the transformer is detected and the power conversion system is so controlled as to output an actual voltage vector close to a command voltage vector that is decided according to the AC system voltage, it is possible to obtain sine wave voltage corresponding to AC system voltage. Further, the actual voltage vector is selected corresponding to a region to which the end point of command voltage vector corresponding to AC system voltage belongs by considering regions each containing one end point of the actual voltage vector that can be output by power conversion system. As a result, the switching operation is taken place only when the end point of command voltage vector moves from a region wherein the end point exists to another region and the switching operation can be suppressed to the minimum. Therefore, a highly efficient power conversion system with reduced switching loss can be obtained.

Further, quantities equivalent to magnetic fluxes interlinking to secondary windings of the transformer are detected, and the power conversion system is so controlled as to balance the magnetic fluxes interlinking to the secondary windings of the transformer by controlling the ON/OFF of self-turn-off switching devices of unit converters according to the size of quantity equivalent to magnetic flux. Accordingly, the power conversion system can be controlled so that no DC component is generated in the voltages applied to the secondary windings. Therefore, even when system voltage is distorted sharply due to system failure, etc. the power conversion system can be continuously operated without saturating the transformer.

Obviously, numerous modifications and variations of the present invention are possible in light of the above teachings. It is therefore to be understood that within the scope of the appended claims, the invention may be practiced otherwise than as specifically described herein.

What is claimed is:

1. A control system for a power conversion system composed of a plurality of unit converters and a transformer for connecting AC outputs of said unit converters in series, each of said unit converters composed of a plurality of bridge connected self-turn-off devices for converting DC power into AC power, each of AC sides of said unit converters connected to one of secondary windings of said transformer, respectively, DC sides of said unit converters connected in parallel to each other, respectively, and a primary winding of said transformer connected in series for each phase to take out an output of said power conversion system and adapted for connecting to an AC power system, said control system comprising:

means for detecting an AC system voltage at said series connected primary winding of said transformer;

means for generating a command voltage vector of a voltage to be output from said power conversion system at said primary winding of said transformer based on said AC system voltage;

actual voltage vector selecting means for preparing a plurality of actual voltage vectors of voltages which can be actually output from said power conversion system at said primary winding of said transformer, preparing a plane in which start points of said actual voltage vectors are commonly taken as an origin and said actual voltage vectors are expressed at respective end points of said actual voltage vectors, dividing said plane into a plurality of regions, each including one of said end points of said actual voltage vectors, respectively, and when an end point of said command voltage vector is included in one of said regions, selecting said actual voltage vector included in said one of said regions as a selected actual voltage vector;

unit converter voltage vector determining means for determining a plurality of unit converter voltage vectors based on said selected actual voltage vector, each of said unit converter voltage vectors allocated to one of said unit converters, respectively, and output from one of said unit converters, respectively;

means for generating a plurality of ON-OFF pattern signals for said self-turn-off devices, each determined by one of said unit converter voltage vectors, respectively; and means for generating gate pulses to said self-turn-off devices of said unit converters based on said ON-OFF pattern signals.

2. The control system for a power conversion system according to claim 1, wherein:

in said actual voltage vector selecting means, said region is composed of a regular hexagonal region.

3. The control system for a power conversion system according to claim 1, wherein in said actual voltage vector selecting means:

said plane is divided into six sections by six directions of six kinds of said unit converter voltage vectors; and each of said six sections is divided into a plurality of said regions, each including one of said end points of said actual voltage vectors, respectively, using two straight lines in parallel with the directions of said two unit converter voltage vectors by which each of said six sections is determined.

4. The control system for a power conversion system according to one of claims 1, 2 and 3, further comprising:

magnetic flux detecting means for detecting quantities equivalent to magnetic fluxes interlinking to said secondary windings of said transformer; and wherein said unit converter voltage vector determining means determines a plurality of said unit converter voltage vectors based on said selected actual voltage vector and said quantities equivalent to said magnetic fluxes, each of said unit converter voltage vectors allocated to one of said unit converters, respectively, and output from one of said unit converters, respectively.

5. The control system for a power conversion system according to claim 4, wherein:

said magnetic flux detecting means includes a plurality of magnetic flux sensors provided in magnetic paths of said secondary windings of said transformer for detecting said quantities equivalent to said magnetic fluxes interlinking to said secondary windings of said transformer.

6. The control system for a power conversion system according to claim 4, wherein said magnetic flux detecting means includes:

voltage detecting means for detecting voltages applied to said secondary windings of said transformer; and incomplete integrator means for incompletely integrating said detected voltages to obtain said quantities equivalent to said magnetic fluxes interlinking to said secondary windings of said transformer;

time constants of said incomplete integrator means are fitted to vanishing characteristic of said magnetic fluxes interlinking to said secondary windings of said transformer.

7. The control system for a power conversion system according to claim 4, wherein said magnetic flux detecting means includes:

means for detecting a DC voltage of said power conversion system; and voltage detecting means for obtaining voltages applied to said secondary windings of said transformer based on said DC voltage of said power conversion system and a plurality of said ON/OFF pattern signals;

incomplete integrator means for incompletely integrating said detected voltages to obtain said quantities equivalent to said magnetic fluxes interlinking to said secondary windings of said transformer incomplete integrated voltages; and time constants of said incomplete integrator means are fitted to vanishing characteristic of said magnetic fluxes interlinking to said secondary windings of said transformer.

* * * * *